United States Patent
Tamiya et al.

(10) Patent No.: US 10,661,181 B2
(45) Date of Patent: May 26, 2020

(54) SIMULATION SYSTEM AND GAME SYSTEM

(71) Applicant: BANDAI NAMCO ENTERTAINMENT INC., Tokyo (JP)

(72) Inventors: Yukiharu Tamiya, Tokyo (JP); Norihiro Nishimura, Tokyo (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/077,865

(22) PCT Filed: Feb. 14, 2017

(86) PCT No.: PCT/JP2017/005245
§ 371 (c)(1),
(2) Date: Aug. 14, 2018

(87) PCT Pub. No.: WO2017/141891
PCT Pub. Date: Aug. 24, 2017

(65) Prior Publication Data
US 2019/0143223 A1    May 16, 2019

(30) Foreign Application Priority Data

Feb. 17, 2016 (JP) .................................. 2016-028425

(51) Int. Cl.
*A63F 13/00* (2014.01)
*A63F 13/80* (2014.01)
(Continued)

(52) U.S. Cl.
CPC ............ *A63F 13/80* (2014.09); *A63F 13/212* (2014.09); *A63F 13/213* (2014.09); *A63F 13/25* (2014.09);
(Continued)

(58) Field of Classification Search
None
See application file for complete search history.

(56) References Cited

U.S. PATENT DOCUMENTS

| | | | | |
|---|---|---|---|---|
| RE45,062 E | * | 8/2014 | Maguire, Jr. ........... | G06F 3/011 345/8 |
| 2001/0045919 A1 | * | 11/2001 | Ishikawa .................. | A47C 7/74 345/8 |

(Continued)

FOREIGN PATENT DOCUMENTS

| JP | 3041990 U | 10/1997 |
|---|---|---|
| JP | H10-293646 A | 11/1998 |

(Continued)

OTHER PUBLICATIONS

Mar. 16, 2017 International Search Report issued in Patent Application No. PCT/JP2017/005245.

(Continued)

*Primary Examiner* — Paul A D'Agostino
(74) *Attorney, Agent, or Firm* — Oliff PLC

(57) ABSTRACT

A game system 1 is configured to detect a player's state (i.e., the position and the attitude of the player in the real space) that represents the state of the player P in the real space, perform an image generation process that generates a simulation image corresponding to the detected player's state, the simulation image being viewed from the player P and representing the simulation space that corresponds to the real space, the simulation image including a virtual moving path that is linked to a moving path R, display the generated simulation image on the HMD 20, determine that the player P is in a specific state in the simulation space when the player's state has satisfied a given condition within the moving path R, and generate a simulation image that pro- (Continued)

duces an effect based on the specific state when it has been determined that the player P is in the specific state.

15 Claims, 16 Drawing Sheets

(51) Int. Cl.
| | |
|---|---|
| A63F 13/213 | (2014.01) |
| A63F 13/28 | (2014.01) |
| A63F 13/25 | (2014.01) |
| A63F 13/55 | (2014.01) |
| A63F 13/52 | (2014.01) |
| A63F 13/428 | (2014.01) |
| A63F 13/90 | (2014.01) |
| G09B 9/00 | (2006.01) |
| A63F 13/27 | (2014.01) |
| A63F 13/212 | (2014.01) |
| A63F 13/26 | (2014.01) |
| G09B 19/00 | (2006.01) |
| A63F 13/285 | (2014.01) |
| H04N 13/344 | (2018.01) |
| G02B 27/01 | (2006.01) |
| G06F 3/01 | (2006.01) |
| G06T 19/00 | (2011.01) |

(52) U.S. Cl.
CPC ............. *A63F 13/26* (2014.09); *A63F 13/27* (2014.09); *A63F 13/28* (2014.09); *A63F 13/285* (2014.09); *A63F 13/428* (2014.09); *A63F 13/52* (2014.09); *A63F 13/55* (2014.09); *A63F 13/90* (2014.09); *G02B 27/0172* (2013.01); *G06F 3/011* (2013.01); *G06T 19/003* (2013.01); *G09B 9/00* (2013.01); *G09B 19/00* (2013.01); *G09B 19/0038* (2013.01); *H04N 13/344* (2018.05); *A63F 2300/8082* (2013.01); *G02B 2027/014* (2013.01); *G02B 2027/0138* (2013.01)

(56) References Cited

U.S. PATENT DOCUMENTS

| | | | | |
|---|---|---|---|---|
| 2013/0286004 | A1* | 10/2013 | McCulloch | G06T 19/006 345/419 |
| 2014/0274564 | A1* | 9/2014 | Greenbaum | A63B 24/0087 482/5 |
| 2014/0306891 | A1* | 10/2014 | Latta | G06F 3/017 345/158 |
| 2014/0364212 | A1* | 12/2014 | Osman | A63F 13/213 463/31 |
| 2015/0348327 | A1* | 12/2015 | Zalewski | G06F 3/01 345/419 |
| 2015/0364021 | A1* | 12/2015 | Ur | F16P 3/142 340/573.1 |
| 2016/0260251 | A1* | 9/2016 | Stafford | G06T 19/006 |
| 2016/0274662 | A1* | 9/2016 | Rimon | G06F 3/014 |
| 2016/0299563 | A1* | 10/2016 | Stafford | G02B 27/017 |
| 2016/0300392 | A1* | 10/2016 | Jonczyk | G06T 19/003 |
| 2016/0341968 | A1* | 11/2016 | Cricri | G06K 9/00335 |
| 2016/0350973 | A1* | 12/2016 | Shapira | G06T 19/006 |
| 2016/0378204 | A1* | 12/2016 | Chen | G01C 3/08 345/156 |

FOREIGN PATENT DOCUMENTS

| | | |
|---|---|---|
| JP | 2000-271342 A | 10/2000 |
| JP | 2002-112287 A | 4/2002 |
| JP | 2003-178332 A | 6/2003 |
| JP | 3096850 U | 1/2004 |
| JP | 2015-150063 A | 8/2015 |
| JP | 2016-218323 A | 12/2016 |

OTHER PUBLICATIONS

Mar. 16, 2017 Kat Walk—A New Solution for Virtual Reality Locomotion Device, Internet: <URL : https ://www. you tube. com/watch?v=HKCKb7uJ o6E>.

Nishikawa, "Sangyoyo Virtual Reality-ten—PSP no Eizo o Giji Rittaishika suru Seihin Nado Display Kanren no Chumoku Goods 4 HEWDD-768 o Katsuyo shita 2 Shurui no VR Demo," Mynavi News, Mynavi Corp., [online], Jun. 27, 2009 (Jun. 27, 2009), [retrieval date Mar. 15, 2017 (Mar. 15, 2017)], Internet: <URL:http://news.mynavi.jp/articles/2009/06/27/ivr02/003.html> (Mynavi Corp.).

"VR•AR de Shinka suru Kaihatsu•Seisan," Nikkei Monozukuri, ISSN: 1349-2772, Nikkei Business Publications, Inc. Aug. 1, 2015, (Aug. 1, 2015), No. 731, pp. 61-66.

Nakamura, Hajime, "JFE Steel, Kanden•Tenraku o Virtual Taiken," Nikkei Biz Academy, Nikkei Inc., [online] URL: http://bizacademy. nikkei.co.jp/career/kenshu/article.aspx?id=MMAC2i000005012015 &print=1>, Jan. 7, 2015 (Jan. 7, 2015), retrieval date Mar. 15, 2017.

* cited by examiner

SIMULATION SYSTEM AND GAME SYSTEM

TECHNICAL FIELD

The present invention relates to a simulation system that utilizes a wearable image display device such as a head-mounted display.

BACKGROUND ART

In the related art, there are wearable image display devices that are worn by and display images to a user. Head-mounted displays (HMD) are examples of such devices. HMDs are generally divided into monocular and biocular devices and are further classified into non-see-through type devices and see-through type devices. In non-see through type devices, vision is secured in the movement space in which the user is actually moving (that is, real space). In see-through type devices, each eye of the user is masked (that is, completely covered) and images linked to the real space are displayed.

Recently, technologies have been proposed for game devices configured as simulation systems that display predetermined images on such an HMD (for example, JP-A-2015-150063). In such technologies, the field-of-view of the user in virtual space is supported, thereby enhancing the effectiveness and immersiveness of the simulated world.

CITATION LIST

Patent Literature

Patent Literature 1: JP-A-2015-150063

SUMMARY OF INVENTION

Technical Problem

However, with the simulation system described in PTL 1, the situation of the user in virtual space is not simulated in correspondence with the movement and/or state of the user in real space. Consequently, it is difficult to simulate a situation that seems real and provide the user with a realistic experience.

An object of the invention is to solve this problem and provide a simulation system synchronized with the state of a user wearing an HMD or similar wearable image display device, thereby enhancing the reproducibility of a variety of locations and spaces including dangerous locations and spaces that are difficult to actually experience, and thereby allowing a user to be provided with a more realistic experience, even in a pseudo-space.

Solution to Problem (1) According to a first aspect of the invention there is provided an experience-type simulation system in which a user utilizes a wearable image display device that comprises a structure masking each eye of a user and that visualizes an image of a virtual three-dimensional space, the user moving, of their own accord, on a moving path formed in user movement space in which the user can move; the system including a detection device that detects a user's state that represents a state of the user in the user movement space;
an image generation device that performs an image generation process to generate a simulation image that corresponds to the detected user's state, the simulation image being viewed from the user and representing virtual three-dimensional space that corresponds to the user movement space, the simulation image including a virtual moving path that is linked to the moving path;
a display control device that displays the generated simulation image on the wearable image display device; and
a state determination device that determines that the user is in a specific state in the virtual three-dimensional space when the user's state has satisfied a given condition in the user movement space; wherein
the image generation device generates a simulation image that produces an effect based on the specific state when it is determined that the user is in the specific state.

The invention that is configured as described above can allow the user to experience, as a simulation, the specific state when the user is in the specific state in synchronization with the state of the user and, therefore, can accurately reproduce the environment or the situation to be experienced by the user, particularly an environment or a situation that is difficult to actually experience such as a moving environment or situation at a high location (including a situation in which the user falls when the user has run off the moving path).

For example, in addition to a high location, the invention can also reproduce a dangerous location or environment or situation that is difficult to actually experience (e.g., an enclosed location, a special space, a hot location, and a cold location) corresponding to the state of the user as a specific state or an environment that produces the specific state.

Accordingly, the invention can enhance the reproducibility of a variety of locations and spaces including dangerous locations and spaces that are difficult to actually experience and, thereby can allow a user to be provided with a more realistic experience, even in a pseudo-space.

Note that a wearable image display device having a structure that masks the eyes of the user and allows the user to view an image of a virtual three-dimensional space is a so-called non-see-through wearable image display device. Such a device completely covers (masks) each eye of the user, thereby allowing the user to view only the displayed image and making it impossible to for the user to view the state of the external world. An example of such a device is a sealed head-mounted display (HMD).

The user's state includes at least one of the position of the user in the user movement space and the attitude of the user and for example:

(A) determines the position of the user in the user movement space (i.e., the coordinates in user movement space) on the basis of information (hereinafter referred to as "part information") about at least one of the position, the direction, the height, and the time of a given part (e.g., head, both hands, or both feet) of the user, (B) determines the attitude of the user represented by the positional relationship between each part (e.g., head, body, both hands, feet) of the user on the basis of the part information of the user, or (C) determines both (A) and (B) and presents the state of the user detected on the basis of the position and/or the attitude of the user.

(2) According to a second aspect of the invention the simulation system further includes:

an effect unit that is provided in the user movement space and that performs an effect process to allow the user to experience the virtual three-dimensional space corresponding to at least one of the user's state and a run state of the simulation.

As a result of the configuration described above, due to the effect unit being utilized, the invention can stimulate senses of the user other than the visual sense and, as such, can generate the virtual three-dimensional space as a more realistic space.

Accordingly, for example, the invention can enhance the reproducibility of a variety of locations and spaces such as dangerous locations and spaces that are difficult to actually experience and, thereby can allow a user to be provided with a more realistic experience, even in a pseudo-space.

Examples of the effect unit include:

(A) effect device that create the environment of the simulation space such as a blower, a temperature control device, or a vibration device;

(B) a member that provides the user with a tactical experience such as convexities and concavities or a material for a wall surface and a floor; and (C) a movable or fixed object (article) that is situated in the simulation space (e.g., an animal or the moving path) and that draws the attention of the user.

(3) According to a third aspect of the invention the effect unit is visualized as an effect object in the virtual three-dimensional space; and the image generation device visualizes a state of the effect object in the virtual three-dimensional space that differs from the state of the effect object in the user movement space corresponding to at least one of the user's state and the run state of the simulation.

As a result of the configuration described above, the invention can produce an effect in only the virtual three-dimensional space in the simulation (e.g., changing (narrowing or widening) the width of the moving path), or can produce an effect of an object that moves in a manner that is difficult to handle (e.g., a person, a cat, or a dog) or a large object (e.g., an airplane or a ship) moving only in the virtual three-dimensional space.

Accordingly, the invention can allow a user to experience, as a simulation, an effect unit that is difficult to control in the user movement space (the real space) or an effect unit that is difficult to reproduce while causing the user to experience the sensation of the actual effect unit article. As such, it is possible to reliably generate the virtual three-dimensional space as a more realistic space.

(4) According to a fourth aspect of the invention, the simulation system further includes:

a positional relationship determination device that determines whether the effect unit, provided in the user movement space and visualized as the effect object, and the user are in a given positional relationship in the user movement space; wherein the image generation device generates the simulation image in which the effect unit is visualized as the effect object corresponding to a determination result of the positional relationship determination device.

As a result of the configuration described above, the invention can run the simulation according to the relationship between the user and the real effect unit that is situated in the user movement space. As such, the user can experience an effect that is not limited to an image.

Accordingly, the invention can allow a user to be provided with a more realistic experience, even in a pseudo-space.

The positional relationship may by determined according to a positional relationship between the effect object and the user or the head, hands, or feet of the user; or various sensors (e.g., contact sensors) may be provided to the object and the presence/absence of contact with these sensors may be determined.

(5) According to a fifth aspect of the invention, the effect unit includes a moving path member formed at a height that differs from a floor of a structure forming the simulation system.

As a result of the configuration described above, the invention can allow a user to experience a situation such as stepping off the moving path. As such, it is possible to provide a more effective simulation.

(6) According to a sixth aspect of the invention, the effect unit includes a moving path member that includes an effect area that is provided under a predetermined moving path on which the user moves, and that is formed capable of vibrating or swinging, and a driving device that vibrates or swings the effect area on the basis of a given condition.

As a result of this configuration, the invention can vibrate or swing the moving path provided in the user movement space. As such, the user that is moving can be allowed to experience various environments in the virtual three-dimensional space in addition to the simulation image, due to the effect unit that is actually provided in real space.

(7) According to a seventh aspect of the invention, the detection device detects, as part information, information about a part of the user wearing the wearable image display device in the user movement space, and detects the user's state on the basis of the detected part information.

As a result of the configuration described above, as described previously, the invention can detect, as the user's state, the position and/or attitude of the user in the user movement space on the basis of a part of the user (e.g., head, hands, or feet) and, as such, can accurately detect the user's state.

(8) According to an eighth aspect of the invention, the detection device detects the part information about a plurality of parts of the user in the user movement space, and detects, as the user's state, the attitude of the user in the user movement space on the basis of the detected part information about the plurality of parts.

As a result of the configuration described above, the invention can detect, as the user's state, the attitude of the user in the user movement space on the basis of a plurality of parts of the user (e.g., head, hands, or feet) and, as such, can accurately detect the user's state.

Note that the phrase "attitude of the user" refers to the attitude formed on the basis of a user model modeled in the user movement space, for example.

(9) According to a ninth aspect of the invention, the detection device detects the user's state on the moving path in the user movement space on the basis of the detected part information of the user in the user movement space, and detects the user's state with respect to a virtual moving path corresponding to the moving path in the user movement space on the basis of the detected user's state on the moving path in the user movement space.

As a result of this configuration, the invention can detect the user's state corresponding to the user's state on the virtual moving path. As such, for example, the width of the moving path can be virtually changed (widened or narrowed) in only the virtual three-dimensional space in the simulation, and the behavior of the user with respect to this virtual change can be associated.

Specifically, the invention can determine the user's state by applying the situation in the virtual three-dimensional space even when the situation in the virtual three-dimensional space differs from the situation in the real space (the user movement space). As such, the invention can allow a user to experience, as a simulation, an effect unit that is difficult to control in the real space (the user movement space) or an effect unit that is difficult to reproduce while causing the user to experience the sensation of the actual effect unit article.

(10) According to a tenth aspect of the invention, the detection device detects, as the part information, one or more pieces of information about a direction and a position of a given part of the user in the user movement space and a length of time of the part at the position, and detects, as the user's state, one of a position of the user and an attitude of the user in the user movement space on the basis of the part information.

As a result of the configuration described above, the invention can accurately detect, as the user's state, the position and the attitude of the user in the user movement space using the part of the user. As such, the invention can allow a user to be provided with a more realistic experience, even in a pseudo-space in the virtual three-dimensional space.

Note that it is sufficient that one or more pieces of information are detected, and one piece of information or a plurality of pieces of information may be detected. However, the accuracy of the position of the user or the attitude of the user increases when more positions of parts or the like are detected as the part information.

Examples of the "given part of the user" include the head, both hands, and both feet of the user; and the "position of the part" refers to a position defined by two-dimensional coordinates (planar coordinates) or three-dimensional coordinates (planar coordinates and a height coordinate) in the user movement space.

Furthermore, the phrase "position of the user" refers to the "center of gravity position" or the "center position" of a user model obtained by modeling the user in the user movement space, for example.

(11) According to an eleventh aspect of the invention, the part of the user includes a foot of the user, and the detection device detects a relationship in the virtual three-dimensional space between the foot of the user and the virtual moving path that corresponds to the moving path on the basis of the detected part information of the foot, and detects the user's state with respect to the virtual moving path on the basis of the detected relationship.

As a result of this configuration, the invention can detect the user's state by the foot as the part of the user. As such, the invention can appropriately detect the user's state on the moving path, and can also precisely detect the user's state in the user movement space from the relationship between the foot of the user and the virtual moving path in the virtual three-dimensional space.

Accordingly, the invention can detect the user's state corresponding to the state on the virtual moving path even when the state of the virtual moving path differs from the state of the actual moving path (e.g., when the virtual moving path is narrower than the actual moving path). As such, the invention can allow a user to be provided with a more realistic experience, even in a pseudo-space in the virtual three-dimensional space.

(12) According to a twelfth aspect of the invention, the detection device detects a correlation between the foot of the user and the virtual moving path as the relationship in the virtual three-dimensional space between the foot of the user and the virtual moving path corresponding to the moving path, the correlation being at least one of an amount of time the foot of the user is separated from the virtual moving path and a distance in the virtual space between the foot of the user and the virtual moving path.

As a result of this configuration, when utilizing the virtual three-dimensional space to realize a situation in which the user has run off the virtual moving path (e.g., when the user falls off the virtual moving path), the invention can, in accordance with the state of the foot of the user, appropriately detect the user's state on the moving path and can also precisely detect the user's state in the user movement space from the relationship between the foot of the user and the virtual moving path in the virtual three-dimensional space.

(13) According to a thirteenth aspect of the invention, the relationship between the foot of the user in the virtual three-dimensional space and the virtual moving path corresponding to the moving path includes a height element in the virtual three-dimensional space, the height element being the distance in the virtual space between the foot of the user and the virtual moving path; and the detection device increases a weighting of the height element more than a weighting of another element when detecting the correlation between the foot of the user and the virtual moving path.

As a result of this configuration, when utilizing the virtual three-dimensional space to realize a situation in which the user has run off the virtual moving path (e.g., when the user falls off the virtual moving path), the invention can weight the height element of the foot to detect the user's state. As such, in simulations where the state of the height in the user movement space is important (e.g., when determining whether a fall has occurred), the invention can appropriately detect that situation in the virtual three-dimensional space.

(14) According to a fourteenth aspect of the invention, the simulation system further includes:

a structure in which a user movement space in which a user can move is formed;

a hanging unit that hangs the wearable image display device structure from the structure; and a hanging position changing device that changes a hanging position of the wearable image display device on the hanging unit corresponding to movement of the user in the user movement space.

Since the invention is configured so that the wearable image display device is hanging, it is possible to ensure that the wearable image display device is continuously worn by the user and does not fall when the user removes the wearable image display device, even when the user loses balance or when the user loses balance and unintentionally falls down as a result of moving in the user movement space or the wearable image display device being put on.

Accordingly, the invention can prevent an unexpected situation in which the user is injured when the user has fallen down while wearing the wearable image display device, or the wearable image display device collides with the floor or a wall surface due to unintentional removal, and breaks or malfunctions, for example.

Since the invention is configured so that the wearable image display device can be hung at a suitable position, and can move or make a motion in an arbitrary direction as long as the hanging position of the wearable image display device can be changed using a rail, an arm, or the like so as to follow the movement of the user, for example, it is possible to ensure that the user wearing the wearable image display device can safely move in the real space, prevent a situation in which the user is injured, and prevent an unexpected situation in which the wearable image display device breaks or malfunctions, for example.

For example, when an image is supplied to the wearable image display device through a cable, or the wearable image display device is controlled through a cable (e.g., when a high-resolution image is used), it is possible to provide a line that connects the wearable image display device and a control device that controls the wearable image display device through the hanging unit. As such, it is possible to prevent a situation in which the movement of the user is limited, or the user feels uncomfortable due to the presence of the line that is situated on the side of the user, or around the feet of the user.

Specifically, the above configuration makes it possible for the invention to ensure smooth movement and safety of the player P wearing the wearable image display device in the user movement space, and prevent unexpected situations such as the user being injured.

Note that, the phrase "hung from the structure" means that the hanging unit is hung from the structure and, for example, it is preferable that the hanging unit is hung from above the user (e.g., from the ceiling of the structure or the like).

Furthermore, in one example, the hanging unit includes a string-like member, such as a string or a band, that has an end (hereinafter referred to as "first end") that attaches to a curved portion of a hook-like member, and a connection member that is used to connect a second end of the string-like member that differs from the first end to the HMD. The string-like member is connected to the wearable image display device at least when the user is wearing the wearable image display device.

The hanging position changing device is, for example, formed from rails (e.g., linear rails), or a combination thereof, or a two-dimensional or three-dimensional movable arm.

DESCRIPTION OF EMBODIMENTS

Next, embodiments of the invention will be described. Note that the following embodiments do not in any way limit the scope of the invention defined by the claims laid out herein.

All of the elements described below in connection with the embodiments should not necessarily be taken as essential elements of the invention. The embodiments are described below taking an example in which a head-mounted display (HMD) is used as the wearable image display device, and the simulation device and the game device are applied to a game system that provides a game by simulating a virtual three-dimensional space in connection with (in synchronization with, or so as to be linked to) the movement of a user in a space (i.e., real space) defined by a structure.

1. OUTLINE OF GAME SYSTEM

Figure 1:
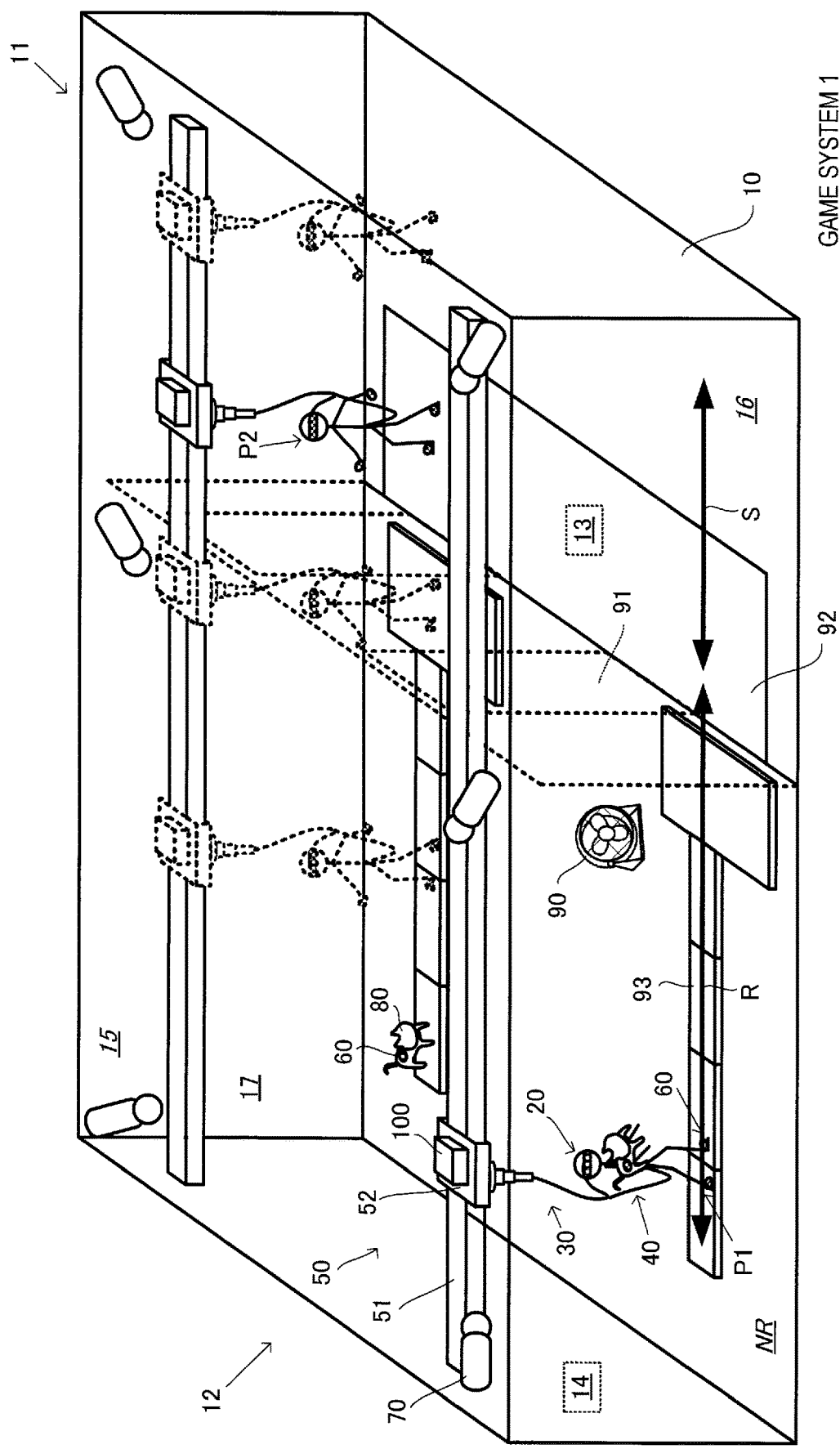
FIG. 1 is a configuration diagram illustrating a schematic configuration of a game system according to an embodiment of the invention.
Figure 2:
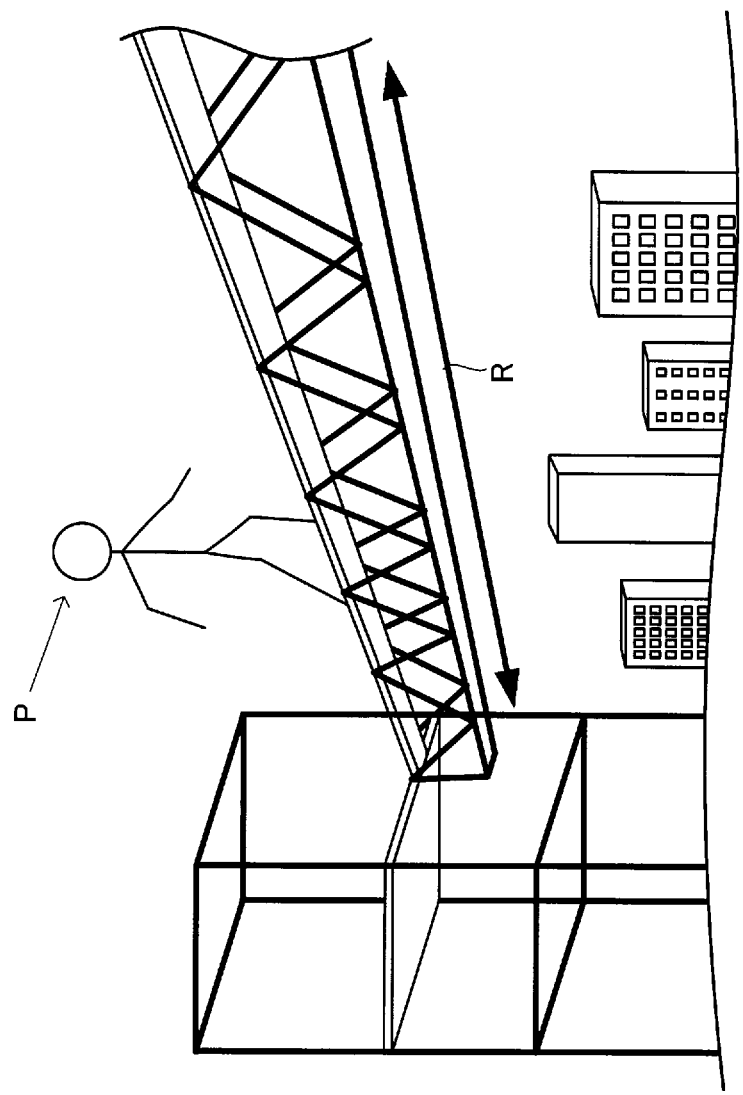
FIG. 2 is a drawing illustrating a virtual three-dimensional space (simulation space) that can be experienced by means of a game system according an embodiment of the invention.

An outline of a game system 1 according to an embodiment of the invention is described below with reference to FIGS. 1 and 2. FIG. 1 is a configuration diagram illustrating a schematic configuration of the game system 1, and FIG. 2 illustrates a virtual three-dimensional space (hereinafter, also referred to as "simulation space") that can be experienced by means of the game system 1.

The game system 1 of the present embodiment mainly includes a structure 10 that defines a real space in which a player P can move (hereinafter simply referred to as "real space"), and an HMD 20 that is worn by the player P, and displays a simulation image of the virtual three-dimensional space (i.e., simulation space) that is linked to the real space.

The game system 1 of the present embodiment is a simulator that generates a simulation image that is viewed from the player P and represents the simulation space that corresponds to the real space, and allows the player P to experience various environments and situations within a pseudo-space.

The game system of the present embodiment is configured to (1) detect a player's state (i.e., the position and the attitude of the player in the real space) that represents the state of the player P in the real space, (2) perform an image generation process that generates a simulation image corresponding to the detected player's state, the simulation image being viewed from the player P and representing the simulation space that corresponds to the real space, the simulation image including a virtual moving path that is linked to a moving path R (see FIG. 2, for example), (3) display the generated simulation image on the HMD 20, (4) determine that the player P is in a specific state in the simulation space when the player's state has satisfied a given condition within the moving path R, and (5) generate a simulation image that produces an effect based on the specific state when it has been determined that the player P is in the specific state.

The game system 1 of the present embodiment includes a hanging unit 30 that hangs the HMD 20 from the structure 10. The hanging unit 30 hangs the HMD 20 independently of the player P so that the HMD 20 follows the motion of the player P when the player P moves in the real space, or a predetermined part (e.g., head) of the player P makes a motion, and the HMD 20 is continuously worn by the player P (or does not fall) even when the player P has unintentionally fallen down.

As illustrated in FIG. 1, the game system 1 of the present embodiment further includes (in addition to the structure 10, the HMD 20, and the hanging unit 30)

(1) a fall prevention unit 40 that prevents a situation in which the player P who moves in the real space falls down, (2) a hanging control unit 50 that changes the hanging position of the HMD 20 with respect to the hanging unit 30 corresponding to the movement of the player P in the real space, and changes the hanging position of the player P corresponding to the movement of the player P in the real space, (3) a marker unit 60 that is attached to a predetermined part (e.g., head, both hands, and both feet) of the player P, and an imaging camera 70 that detects the direction and the position of each part by detecting the marker unit 60, and detects the state (player's state) of the player P in the real space, (4) various effect device 90 to 93 and an effect object 80 that are disposed in the real space, and allow the player P to experience a given effect in synchronization with the simulation image, and (5) a simulation control device 100 that generates a simulation image that is viewed from the player P and represents the simulation space (virtual three-dimensional space) that is linked to the real space, and controls the effect device 90 to 93 in synchronization with the simulation image corresponding to the detected player's state.

The game system 1 of the present embodiment that is configured as described above can allow the player P to experience the specific state (simulation) when the player P is in the specific state in synchronization with the state of the player P and, as such, can accurately reproduce the environment or the situation to be experienced by the player P (particularly an environment or a situation that is difficult to actually experience (e.g., a moving environment or high location (including a situation in which the player P falls when the player P has run off the moving path R))).

For example, the game system 1 can reproduce not only a high location, but also a dangerous location or environment or situation that is difficult to actually experience such as an enclosed location, a special space, a hot location, and a cold location, corresponding to the state of the player P as a specific state or an environment that produce the specific state.

Accordingly, the game system 1 of the present embodiment can enhance the reproducibility of a variety of locations and spaces including dangerous locations and spaces that are difficult to actually experience and, thereby, can allow a user to be provided with a more realistic experience, even in a pseudo-space.

Since the game system 1 of the present embodiment is configured so that the HMD 20 can be hung independently of the player P, it is possible to ensure that the HMD 20 is continuously worn by the player P, and does not fall even when the HMD 20 has been removed from the player P, even when the HMD 20 has moved in the forward-backward direction, the rightward-leftward direction, or the upward-downward direction, due to the movement of the player P in the real space, or the motion of a predetermined part (e.g., head) of the player P, or the player P has unintentionally lost his/her balance, and fallen down.

Therefore, the game system 1 of the present embodiment can prevent an unexpected situation in which the player P is injured when the player P has fallen down while wearing the HMD 20, or the HMD 20 collides with the floor or a wall surface due to unintentional removal of the HMD 20, and breaks or malfunctions, for example.

Since the game system 1 is configured so that the HMD 20 can be hung at a suitable position, and can move or make a motion in an arbitrary direction as long as the hanging position of the HMD 20 can be changed using a rail, an arm, or the like so as to follow the movement of the player P, for example, it is possible to ensure that the player P who wears the HMD 20 can safely move in the real space, prevent a situation in which the player P is injured, and prevent an unexpected situation in which the HMD 20 breaks or malfunctions, for example.

For example, when an image is supplied to the HMD 20 through a cable, or the HMD 20 is controlled through a cable (e.g., when a high-resolution image is used), it is possible to provide a line that connects the HMD 20 and a control device that controls the HMD 20 through the hanging unit. As such, it is possible to prevent a situation in which the movement of the player P is limited, or the player P feels uncomfortable due to the presence of the line that is situated on the side of the player P, or around the feet of the player P.

Specifically, the above configuration makes it possible for the game system 1 of the present embodiment to ensure smooth movement and safety with respect to the player P who wears the HMD 20 in the real space, and prevent an unexpected situation in which the player P is injured, for example.

Note that the embodiments of the invention are described below taking an example in which the game system 1 implements a game that allows the player to experience a fear of heights (hereinafter referred to as "fear of heights experience game").

2. CONFIGURATION OF GAME SYSTEM

2-1 Structure

Figure 3:
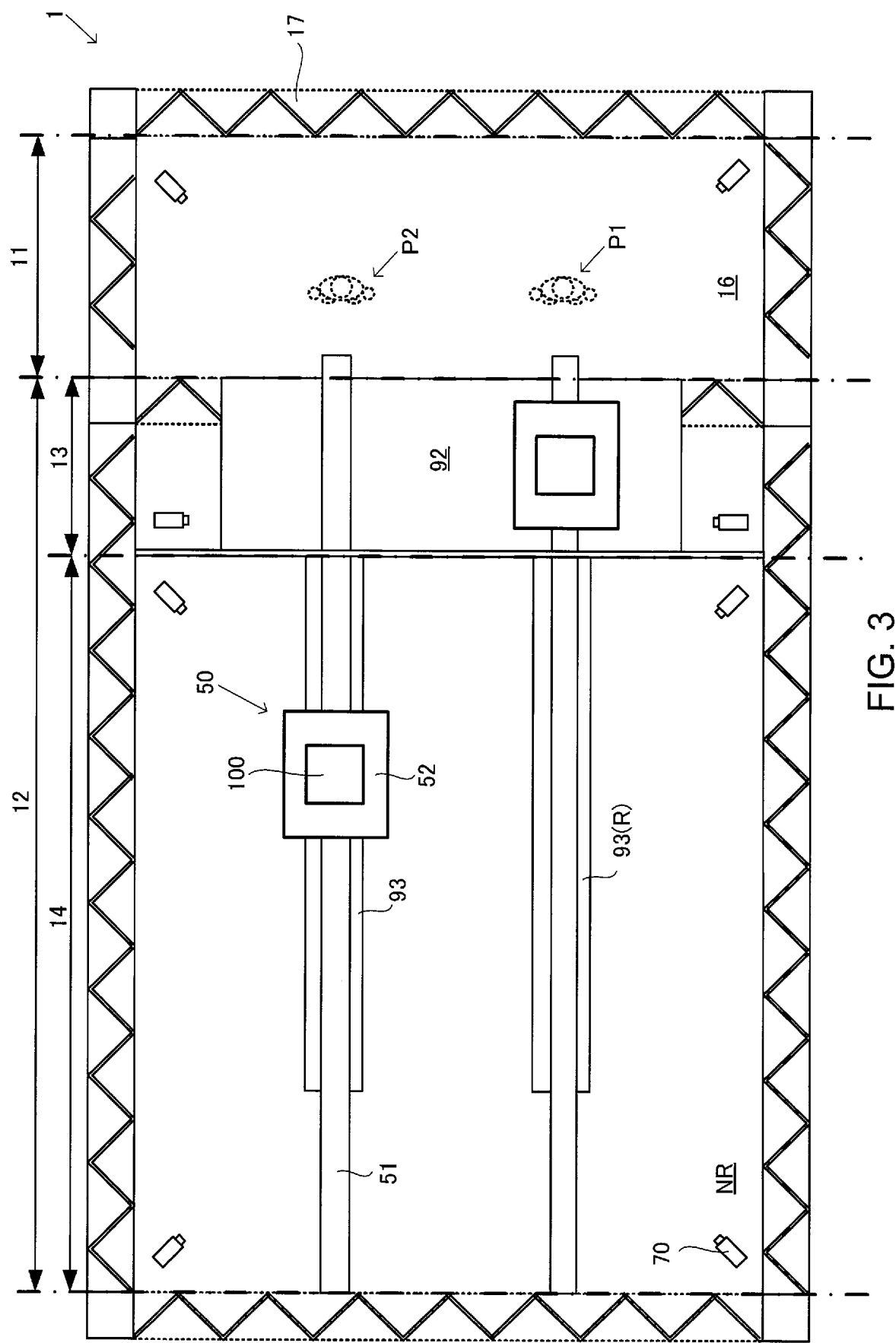
FIG. 3 is a plan view illustrating the configuration of a structure according to an embodiment of the invention.
Figure 4:
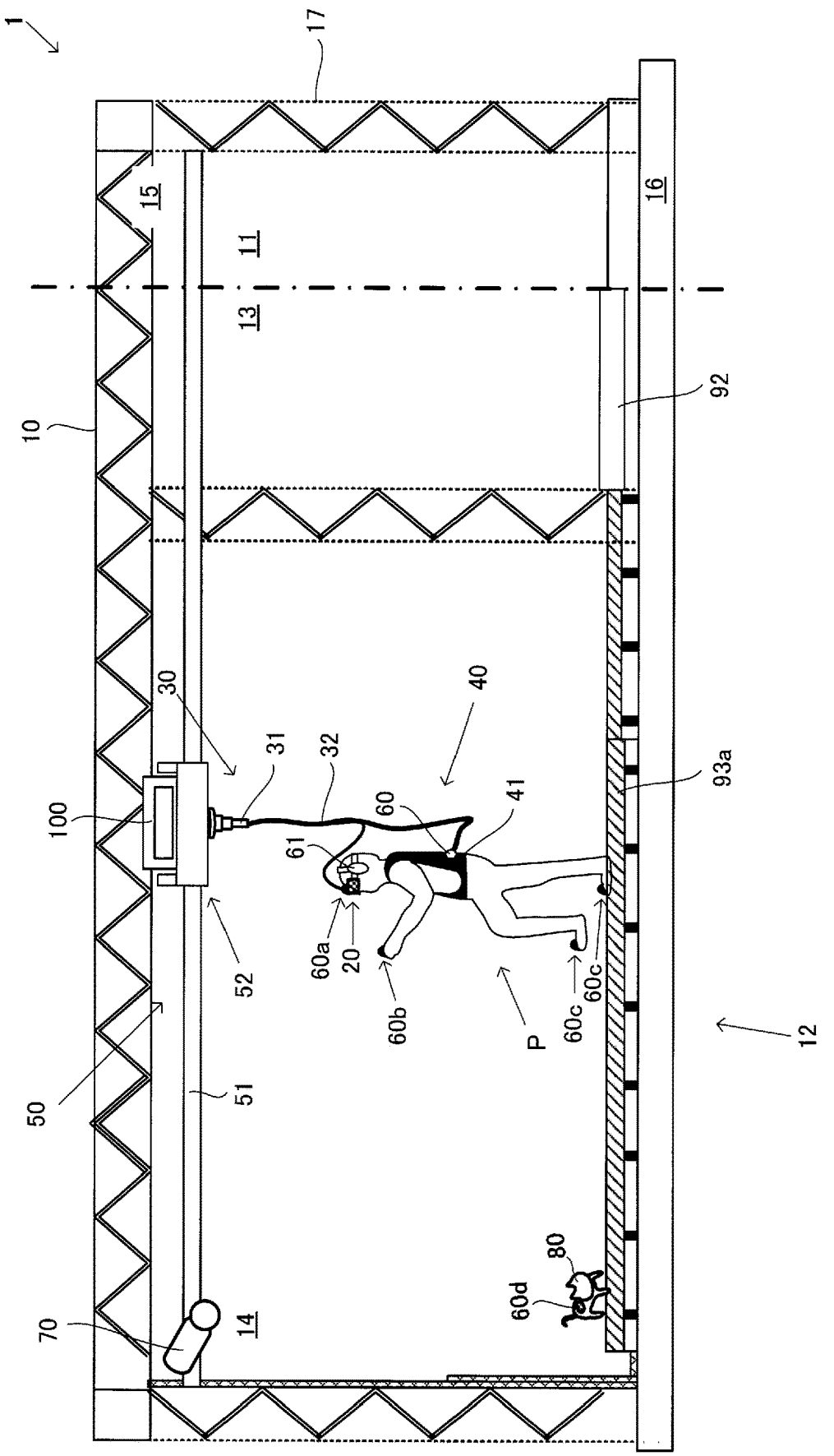
FIG. 4 is a cross-sectional view illustrating the configuration of a structure according to an embodiment of the invention.

The structure 10 included in the game system 1 is described below with reference to FIGS. 1, 3, and 4. FIG. 3 is a plan view illustrating the configuration of the structure 10, and FIG. 4 is a cross-sectional view illustrating the configuration of the structure 10.

The structure 10 is a housing that defines the real space in which the player P can move and the game is implemented. As illustrated in FIGS. 1, 3, and 4, the structure 10 has a box-like structure having a rectangular parallelepiped shape, and has a ceiling 15, a floor 16, and a wall 17 that defines (covers) each side of the real space, for example.

The structure 10 includes a standby area 11 in which the player P stands by before playing the experience-type game, and a play area 12 in which the player P plays the experience-type game. The play area 12 includes a start zone 13 in which the player P stands when starting the game, and a movement experience zone 14 in which the player P actually moves to experience a predetermined environment and situation, and the moving path R in which the presence of each player P is allowed during the game is formed.

A plurality of hanging control units 50 are provided on the ceiling 15 from the standby area 11 to the play area 12 and along the moving path R in the movement experience zone 14. The plurality of hanging control units 50 are slidably provided with the hanging unit 30 that hangs the HMD 20, and the fall prevention unit 40 that prevents a situation in which the player P falls down.

Each hanging control unit 50 is provided with the simulation control device 100 that corresponds to each moving path.

The ceiling 15 is provided with a plurality of imaging cameras 70 that are used to detect the player's state with respect to the player P and the state of the effect object 80. The plurality of imaging cameras 70 are provided at predetermined positions.

The floor 16 has a different configuration by area for the standby area 11 and the play area 12, and by zone for the start zone 13 and the movement experience zone 14.

Specifically, the floor 16 is formed by a panel (i.e., spring floor panel) 92 that is provided with a spring that produces an elevator environment (i.e., effect means) in the start zone 13 included in the play area 12.

The movement experience zone 14 included in the play area 12 includes a moving path R in which the player P walks, and which is formed by a predetermined member (moving path member 93 described later) (e.g., metal), and a non-moving path NR in which the player P cannot move, and which is formed by a mat or the like that protects the player P when the player P has fallen down.

The start zone 13 of the present embodiment has a structure that provides a virtual three-dimensional space defining the inner space of an elevator. An automatic door 91 (effect device) that functions as the door of the elevator and is opened and closed under control of the simulation control device 100 is provided at the boundary between the start zone 13 and the movement experience zone 14.

The effect object 80 is placed on the moving path R (i.e., at the end point of the moving path member 93). Effect device (e.g., blower 90) is optionally provided on the non-moving path NR, and a sensor unit (e.g., contact sensor) may also optionally be provided on the non-moving path NR.

The wall 17 is formed by a predetermined wall panel, or a mat that protects the player P from being injured due to a collision, for example.

2-2 HMD and Hanging Unit

The HMD 20 that is used to implement the game system 1 of the present embodiment and the hanging unit 30 that hangs the HMD 20 are described below with reference to FIGS. 4, 5A, and 5B.

Figure 5B:
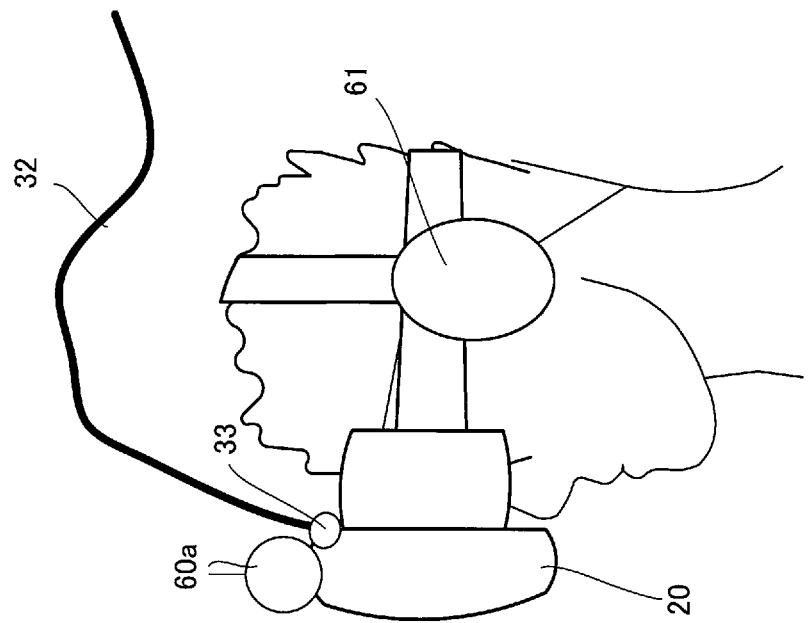
FIG. 5B is a side view illustrating the configuration of an HMD that is used in a game system according to an embodiment of the invention.
Figure 5A:
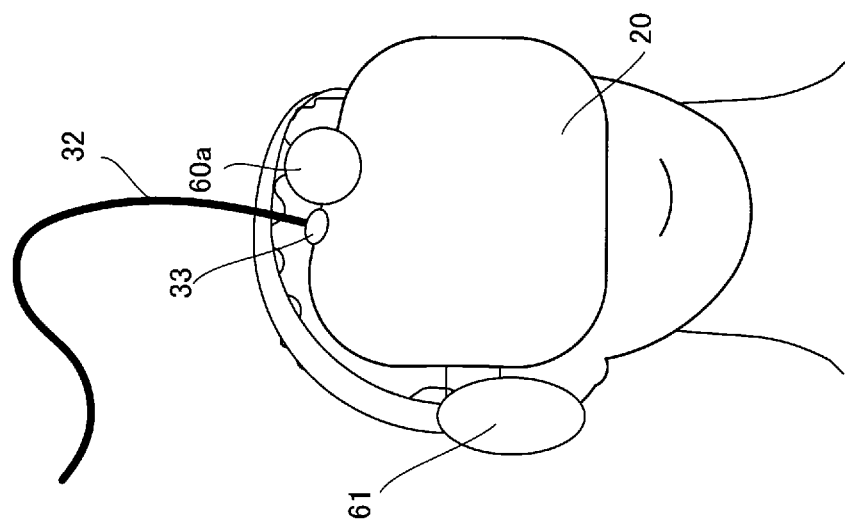
FIG. 5A is a perspective view illustrating the configuration of an HMD that is used in a game system according to an embodiment of the invention.

FIG. 5A is an example of a perspective view illustrating the configuration of the HMD 20 used to implement the game system 1 of the present embodiment. FIG. 5B is an example of a side view illustrating the configuration of the HMD 20 that is used to implement the game system 1 of the present embodiment. The HMD 20 of the present embodiment constitutes the wearable image display device according to the embodiments of the invention, for example.

The HMD 20 is a non-see-through wearable display device that is worn on the head of the player P, and displays an image of the virtual three-dimensional space under control of the simulation control device 100. The HMD 20 allows the player P to view only the displayed image (i.e., does not allow the player P to view the state of the external world), and allows the player P to visually experience augmented reality.

As illustrated in FIGS. 4, 5A, and 5B, the HMD 20 is configured to completely cover (mask) each eye of the player P, and allow the player P to view the simulation image that is viewed from the player P and represents the simulation space that is linked to the real space within the structure 10 in synchronization with the detected player's state.

A marker unit (hereinafter referred to as "head detection marker unit") 60a that is used to detect the direction and the position of the head of the player P is provided to the upper part of the HMD 20. In one example, the HMD 20 has a display size of 200×1080 pixels and a refresh rate of 90 fPS.

The HMD 20 includes a headphone jack (not illustrated in the drawings), and a headphone 61 is connected to the headphone jack. The player P wears the headphone 61 together with the HMD 20. The headphone 61 outputs an ambient sound (stereophonic sound) in the simulation space that is generated by the simulation control device 100.

The hanging unit 30 is configured to connect the HMD 20 and the hanging control unit 50 that is disposed above the player P (e.g., provided on the ceiling 15 of the structure 10) so that the hanging unit 30 hangs the HMD 20 while being hung from the structure 10.

The hanging unit 30 on the present embodiment is provided on the upper part (i.e., the ceiling 15) of the structure 10 so as to be situated over the head of the player P such that the hanging unit 30 can hang the HMD 20 to be able to follow the movement and the motion of the player P in any direction within the play area 12.

The hanging unit 30 includes a line (hereinafter referred to as "cable") that connects the HMD 20 and the simulation control device 100 through a cable communication channel.

Specifically, in one example, as illustrated in FIGS. 4, 5A, and 5B, the hanging unit 30 includes a link member 31 that is used to link the hanging unit 30 to the hanging control unit 50, a string-like member (cable) 32 that has an end (hereinafter referred to as "first end") that is shaped to be attached to the link member 31, and a connection member 33 that is used to connect a second end of the string-like member 32 that differs from the first end to the HMD 20.

The string-like member 32 has a structure that prevents a situation in which the HMD 20 contacts the floor of the structure 10 when the player P has made a large motion (e.g., when the player P is about to fall down), and the HMD 20 has been removed from the player P.

Specifically, the string-like member 32 includes a cable that is stretchable, and transfers a predetermined signal and data transmitted from the simulation control device to the HMD 20.

In one example, the string-like member 32 has a length that prevents a situation in which the HMD 20 contacts the floor of the structure 10 when the HMD 20 has been removed from the player P, or is formed in a stretchable spiral shape that prevents a situation in which the HMD 20 contacts the floor of the structure 10 when the HMD 20 has been removed from the player P, or is configured so that the cable can be wound to adjust the length of the string-like member 32 and prevent a situation in which the HMD 20 contacts the floor of the structure 10 when the HMD 20 has been removed from the player P.

Note that it suffices that the HMD 20 of the present embodiment be configured to be worn by the player P, and display an image so as to be viewable by the player P. The HMD 20 may be a see-through HMD provided that the simulation can be accurately performed.

When a signal or data is transferred between the HMD 20 and the simulation control device 100 through a wireless communication channel, the string-like member 32 need not necessarily be a cable, but may be a string formed of a predetermined material, or may be a band-like member having a certain width.

A portion of the parts of the hanging unit 30, namely the link member 31 and the string-like member 32 are used in common by the hanging unit 30 and the fall prevention unit 40 (as described below).

2-3 Fall Prevention Unit

The fall prevention unit 40 included in the game system 1 of the present embodiment is described below with reference to FIG. 4. In one example, the fall prevention unit 40 of the present embodiment constitutes the falling down prevention device of the invention.

The fall prevention unit 40 is used to support the player P and prevent the player P from falling down when, due to wearing the HMD 20 and/or due to the moving path R in which the player P can walk being narrow, the player P has lost his/her balance or when the player P has lost his/her balance and unintentionally fallen down.

The fall prevention unit 40 is configured so that it is possible to prevent a situation in which the HMD 20 breaks, or the player P is injured, when the player P has lost his/her balance, and also prevent a situation in which the player P falls down (e.g., the player P loses his/her balance during movement, and falls down) due to the HMD 20 that is worn by the player P during the game.

Specifically, as illustrated in FIG. 4, in one example, the fall prevention unit 40 includes a holder member 41 that holds the player P, and a hanging member that hangs the player P from the structure 10. The hanging member is implemented by the members of the hanging unit 30, namely the link member 31 and the string-like member 32 described above.

In one example, the holder member 41 is implemented by a sleeveless vest-type jacket. The holder member 41 is worn by the player P during the game, and holds the player P during the game. The holder member 41 is connected to one end of the string-like member 32, and supports the body of the player P through the link member 31 that is provided on the ceiling 15 of the structure 10.

2-4 Hanging Control Unit

The hanging control unit 50 that is included in the game system 1 of the present embodiment is described below with reference to FIGS. 1, 3, and 4. In one example, the hanging control unit 50 of the present embodiment constitutes the first hanging position changing device and the second hanging position changing device of the invention.

The hanging control unit 50 of the present embodiment is a unit that changes the hanging position of the player P and the hanging position of the HMD 20 corresponding to the movement of the player P in the real space that is defined by the structure 10. The hanging control unit 50 is configured to necessarily hang the HMD 20 and the player P from above (i.e., from the ceiling of the structure 10).

The hanging control unit 50 is configured to hang the HMD 20 and the player P at an appropriate position in the real space and follow the movement and the motion of the player P in the moving direction. Additionally, the hanging control unit 50 is configured to prevent an unexpected situation in which the player P is injured during the simulation, or the HMD 20 breaks or malfunctions while ensuring safety with respect to the player P.

Therefore, the hanging control unit 50 can appropriately prevent a situation in which the movement of the player P is limited, or the player P feels uncomfortable (due to a cable that supplies a signal and data to the HMD 20, and a member that holds the player P and is provided on the side of the player P or under the player P) even when the player P arbitrarily moves in the real space, and can appropriately and necessarily hang the HMD 20 and the player P even when the player P moves or makes a motion.

More specifically, the hanging control unit 50 is integrally formed from the standby area 11 to the play area 12, and is configured so that the HMD 20 and the fall prevention unit 40 follow the player P who moves in the real space, or the player P who changes in attitude.

For example, the hanging control unit 50 of the present embodiment includes a rail 51 that is provided corresponding to each player P who moves in the real space, and is formed along the moving direction of the player P from the standby area 11 (i.e., a point at which the player P puts on the HMD 20 and the fall prevention unit) to the play area 12, and a sliding member 52 that is connected to the link member 31 of the hanging unit 30, and that slides along the rail 51 (see FIGS. 1, 3, and 4).

Each rail 51 is provided on a portion of the ceiling over the moving path R in the movement experience zone 14 in which the player P moves along the moving path R (i.e., the zone in which the player P linearly moves in the forward-backward direction).

In an area in the real space other than the movement experience zone 14, each rail 51 is provided along a path (hereinafter referred to as "guiding path") S along which the player P is guided to the start position and the like when the player P plays the simulation after the player P has put on the HMD 20 and the fall prevention unit 40.

Note that the rail 51 is not limited as to the shape, the material, and the like, provided that the position of the hanging unit 30 can be changed corresponding to the movement of the player P.

The sliding member 52 slides along the rail 51 according to tension produced corresponding to the state (e.g., movement or change in attitude) of the player P, and changes the hanging position of the HMD 20 and the player P through the hanging unit 30.

As illustrated in FIGS. 1, 3, and 4, the sliding member 52 is configured so that the simulation control device 100 is secured thereon in order to reduce the length of the cable that electrically connects the HMD 20 and the simulation control device 100, and reliably transfer a signal and data. Additionally, the sliding member 52 is configured to slide together with the simulation control device 100.

The sliding member 52 is not particularly limited provided that the sliding member 52 slides along the rail 51, and changes the hanging position of the HMD 20 and the player P through the hanging unit 30 corresponding to the state (e.g., movement or change in attitude) of the player P.

2-5 Simulation Control Device

Next, the simulation control device 100 included in the game system 1 of the present embodiment is described below with reference to FIG. 6.

Figure 6:
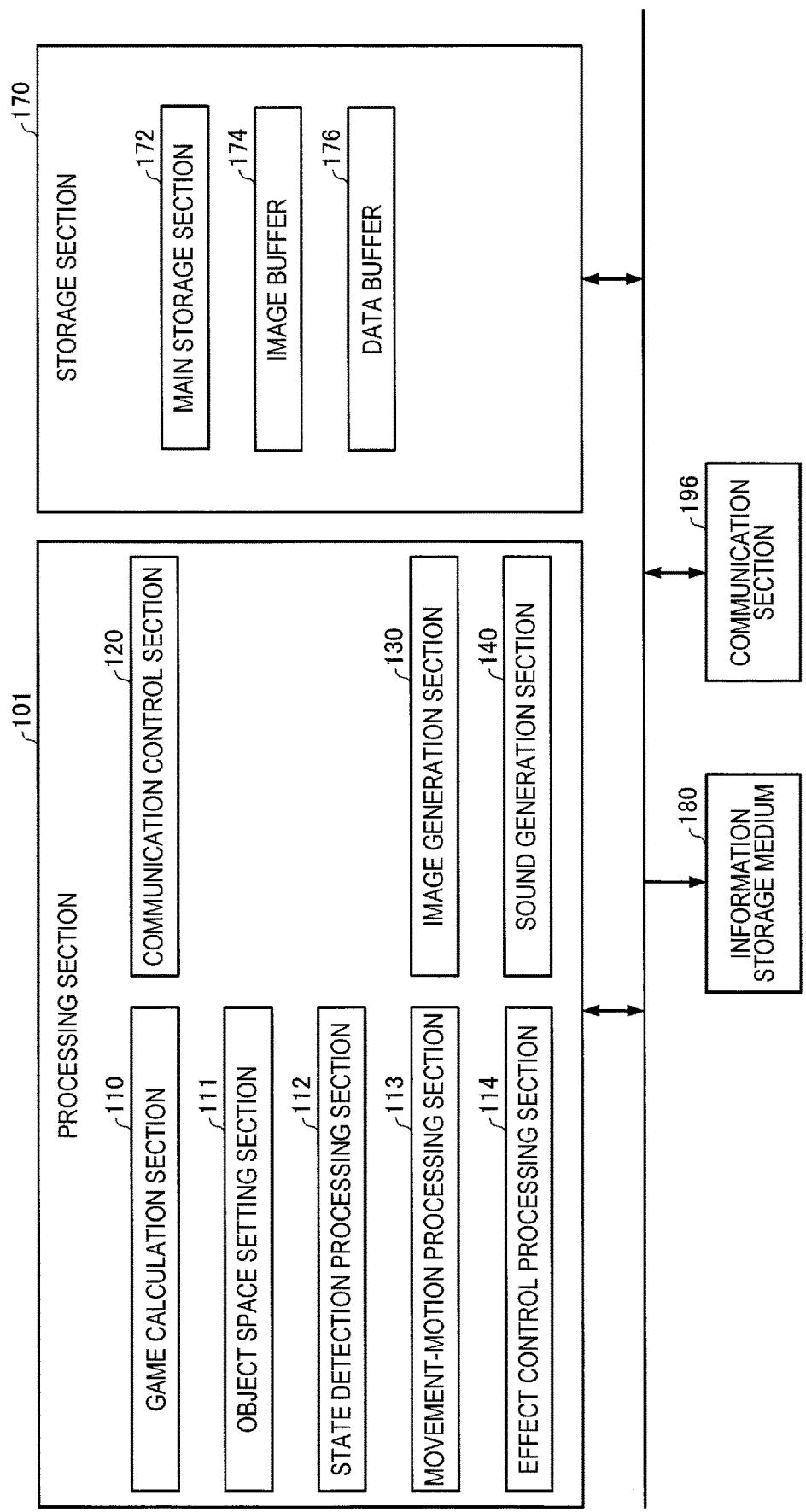
FIG. 6 is a configuration diagram illustrating the block configuration of a simulation control device according to an embodiment of the invention.

FIG. 6 is a configuration diagram illustrating the block configuration of the simulation control device 100 of the present embodiment. In one example, the simulation control device 100 of the present embodiment constitutes the image generation device, the state determination device, and the positional relationship determination device of the invention and, together with the imaging camera 70, constitutes the detection device of the invention. Note that the configuration of the simulation control device 100 of the present embodiment is not limited to the configuration illustrated in FIG. 6. Various modifications and variations may be made, such as omitting some of the elements illustrated in FIG. 6, or providing an additional element.

The simulation control device 100 is implemented by a computer-controllable device such as a personal computer. An operation section (e.g., keyboard) (not illustrated in FIG. 6) that is operated by the administrator is removably provided to the simulation control device 100.

The simulation control device 100 that provides the simulation space to the player P is configured to generate an image that corresponds to the state of the game while proceeding with the game corresponding to the player's state and the elapsed time, and control the effect device 90 to 93 in synchronization with the effect control device.

The simulation control device 100 acquires an image output from the imaging camera 70, detects a marker of the marker unit 60 from the acquired image, and detects the player's state on the basis of the positional relationship between the area to which the marker belongs and another marker, and the time of stay in the area to which the marker belongs.

The simulation control device 100 includes a storage section 170 that stores various types of data, an information storage medium 180 that stores data (e.g., simulation application), a processing section 101 that performs various processes that implement the game and generate the environment to be simulated by the game, and a communication section 196.

The storage section 170 serves as a work area for the processing section 101 and the communication section 196. The functions of the storage section 170 may be implemented by RAM (DRAM or VRAM) or the like. The storage section 170 of the present embodiment includes a main storage section 172 that mainly stores (records) a game program, an image buffer 174, and a data buffer 176.

The main storage section 172 mainly stores (records) the game program and information related to the game environment such as the attributes of the player P. The data buffer 176 is a storage area that stores game data of the game system. For example, the data buffer 176 may be implemented as a part of a main storage, and read-out processes and writing processes thereof may be controlled by means of software.

More specifically, the data buffer 176 of the present embodiment stores a type of the player's state (mission fail state and event generation state, described later), the type of event to implement when the player's state is the event generation state, the position of the player in the real space (e.g., positional coordinates in three dimensions), the attitude of the player (relative coordinates, based on bone data, in real space of the head, hands, and feet), image data of the object of the like to be used in the simulation image generated when implementing the event, and effect control data for implementing the effect.

The game program is software that includes an instruction code for executing the game process. The game data includes data for determining whether or not the player is in the specific state, data required when executing the game program, data with respect to the effect object 80, a control program for controlling the various effect device 90 to 93, and the like.

The information storage medium 180 (computer-readable medium) stores a program, data, and the like. The function of the information storage medium 180 may be implemented by an optical disk (CD or DVD), a hard disk drive (HDD), a memory (e.g., ROM), or the like.

The processing section 101 performs the various processes of the present embodiment on the basis of the program (data) stored in the information storage medium 180. Specifically, a program that causes a computer (i.e., a device that includes an operation section, a processing section, a storage section, and an output section) to function as each section of the present embodiment (i.e., a program that causes a computer to perform the process of each section) is stored in the information storage medium 180.

The communication section 196 communicates with the HMD 20 through a cable, and communicates with the imaging camera 70 and the effect device 90 to 93 through a cable or wireless network. The function of the communication section 196 may be implemented by hardware such as a communication ASIC or a communication processor, and communication firmware.

A program (data) that causes a computer to function as each section of the present embodiment may be distributed to the information storage medium 180 (or the storage section 170) from an information storage medium included in a host device (server system) (not illustrated in the drawings) through a network and the communication section 196. Use of the information storage medium included in the host device is also intended to be included within the scope of the invention.

The processing section 101 (processor) performs a game calculation process, an image generation process, a sound generation process, an effect control process, and the like on the basis of the timing with respect to the game start timing, data of an image output from the imaging camera 70 (hereinafter referred to as "image data"), a program, and the like.

The processing section 101 performs various processes using the storage section 170 as a work area. The function of the processing section 101 may be implemented by hardware such as a processor (e.g., CPU or GPU) or an ASIC (e.g., gate array), and a program.

The processing section 101 includes a game calculation section 110, an object space setting section 111, a state detection processing section 112, a movement-motion processing section 113, an effect control processing section 114, a communication control section 120, an image generation section 130, and a sound generation section 140. Note that the processing section 101 may have a configuration in which some of these sections are omitted.

The game calculation section 110 performs a process that starts the game when a game start condition has been satisfied, a process that proceeds with the game, a process that places objects (including the effect object 80) necessary for forming the simulation space, a process that displays the objects, a process that terminates the game when a game termination condition has been satisfied, and the like.

The game calculation section 110 of the present embodiment detects the line-of-sight direction of the player P and an area that intersects the line of sight of the player P (hereinafter referred to as "line-of-sight area") corresponding to the detected player's state (i.e., the position of the player P in the real space, and the attitude of the player P), and sets a space that is viewed from the player P within the three-dimensional space corresponding to the detected line-of-sight direction, the detected line-of-sight area, the current game environment, and the state of the game.

The game calculation section 110 determines whether or not the game termination condition has been satisfied corresponding to the detected player's state, or on the basis of a predetermined elapsed time from the start of the game, and terminates the game when it has been determined that the game termination condition has been satisfied.

The game calculation section 110 determines whether or not the player P is in the specific state during the game corresponding to the detected player's state on the basis of the data stored in advance in the data buffer 176, and proceeds with the game corresponding to the determination result. The game calculation section 110 also instructs the effect control processing section 114, the image generation section 130, and the sound generation section 140 to implement the corresponding effect.

The object space setting section 111 places an object (i.e., an object formed by a primitive such as a polygon, a free-form surface, or a subdivision surface) (e.g., effect object 80, building, moving path R, pillar, wall, and map (geographical feature)) that is used to form a predetermined simulation space in an object space (i.e., virtual three-dimensional space).

Specifically, the object space setting section 111 determines the position and the rotational angle (synonymous with orientation or direction) of the object in a world coordinate system, and places the object at the determined position (X, Y, Z) and the determined rotational angle (rotational angles around X, Y, and Z-axes).

In the present embodiment, the effect object 80 includes a moving object (e.g., animal) that appears in the simulation space (hereinafter referred to as "effect moving object"), and an object that is placed in the real space so that the player P can determine a stationary object placed in the simulation space (hereinafter referred to as "effect stationary object"), and the object space setting section 111 places these effect objects 80 in the simulation space.

In the present embodiment, the effect moving object includes an object that moves in the real space, and also moves in the simulation space (when imaged) (hereinafter referred to as "true moving object"), and an object that does not move in the real space, and moves only in the simulation space (when imaged) (hereinafter referred to as "pseudo-moving object").

The state detection processing section 112 determines the positions of the marker units 60 provided to both hands and both feet of the player P and the upper part of the HMD 20 at an identical timing within the image (hereinafter referred to as "player's image") of the player P output from a plurality of imaging cameras 70 that capture the player P.

The state detection processing section 112 detects the player's state that represents the position and the attitude of the player P in the real space on the basis of the determined position of each marker unit 60 within each image, the positional relationship between the marker units 60, and the time of stay of each marker unit 60 at each position.

In the present embodiment, a plurality of predetermined areas in the real space are set to the image output from each imaging camera 70. The state detection processing section 112 detects the position of each marker unit 60 in the real space on an image frame basis by detecting the position of each marker unit 60 included in each player's image at an identical timing as to an area to which each marker unit 60 belongs.

The state detection processing section 112 compares the detected position of each marker unit 60 with the position of each marker unit 60 in the previous frame while detecting the position of each marker unit 60 in the real space on a frame basis, and detects the time of stay of each marker unit 60 at an identical position on the basis of the number of frames in which each marker unit 60 has been detected to be situated at an identical position.

The state detection processing section 112 detects the attitude of the player P in the real space on the basis of the position of each marker unit 60 in the real space at an identical timing, and the time of stay of each marker unit 60.

Specifically, the state detection processing section 112

(1) determines the position of the player P in the real space (i.e., the coordinates of the center position (center-of-gravity position) of the player P in the real space) on the basis of information (hereinafter referred to as "part information") about at least one of the position, the height, and the time of a given part (e.g., head, both hands, or both feet) of the player P, (2) determines the attitude of the player P represented by the positional relationship between each part (e.g., head, body, hands, and feet) of the player P on the basis of the part information about the player P, or (3) determines (1) and (2) and detects the player's state on the basis of the position and/or the attitude of the player P.

The state detection processing section 112

(A) detects the viewpoint position and the viewpoint direction of the player P in the real space on the basis of the position of the head of the player P, (B) detects the standing position and the attitude of the player P in the real space on the basis of the position of the hand or the position of the foot of the player P, and (C) models the player P (forms bones) on the basis of the detected standing position and the attitude of the player P.

For example, the parts of the player P include the head, the hand, or the foot of the player P, and the direction or position of the parts of the player P includes the direction of the head, the position of the head, the direction of the hand, the position of the hand, the direction of the foot, and the position of the foot.

The state detection processing section 112 determines the position of the marker unit 60 provided to the effect moving object in the real space in the same manner as described above for the player P, and detects the position (i.e., the center position or the center of gravity position) of the effect moving object in the real space on the basis of the position of the marker unit 60 in the real space and, optionally, the state of the effect moving object.

The state detection processing section 112 performs a determination process to determine whether or not the player is in the specific state (i.e., the corresponding state during the game). The state detection processing section 112 of the present embodiment constitutes the state determination device and the positional relationship determination device of the invention.

The movement-motion processing section 113 calculates the positional relationship between the player P and the effect object 80 on the basis of the detected player's state, the current game environment, the state of the game, or information about two or more items among the player's state, the current game environment, and the state of the game, and performs a movement-motion calculation process (movement-motion simulation process) on the effect object 80 on the basis of the calculated positional relationship between the player P and the effect object 80.

Specifically, the movement-motion processing section 113 causes various objects to move or make a motion (animation) in the object space on the basis of the detected player's state and the like.

Specifically, the movement-motion processing section 113 performs a simulation process that sequentially calculates movement information (position, rotational angle, speed, or acceleration) and motion information (i.e., the position or the rotational angle of each part that forms the object) about each object every frame (1/60th of a second).

Note that the term "frame" refers to a time unit used when the object movement-motion process (simulation process) and the image generation process are performed.

The movement-motion processing section 113 calculates the movement information and the motion information about the effect moving object on the basis of the position of the effect moving object in the real space, the positional relationship between the effect moving object and the player P in the real space, the state of the effect moving object (i.e., the moving direction and the attitude of the effect moving object), the current game environment, and the state of the game.

The movement-motion processing section 113 calculates the movement information and the motion information about the pseudo-moving object (effect moving object) in the simulation space on the basis of the position and/or the state of the pseudo-moving object in the real space corresponding to the user's state in synchronization with the position and the state in the real space, or so that an image can be formed in a seamless manner with respect to the position and the state in the real space.

For example, when the pseudo-moving object is an animal object (e.g., cat), the movement-motion processing section 113 calculates the movement information and the motion information about the pseudo-moving object so that the pseudo-moving object makes a motion at a position that differs from the position at which the pseudo-moving object is placed in the real space, or moves over different areas, returns to the position at which the pseudo-moving object is placed in the real space at a predetermined timing, and is placed in the same manner as in the real space.

In such a case, the movement-motion processing section 113 calculates the movement information and the motion information so that the pseudo-moving object is visualized (imaged) at the position at which the pseudo-moving object is placed in the real space, and the motion (e.g., attitude and gesture) of the pseudo-moving object is visualized.

More specifically, the movement-motion processing section 113 calculates the movement information and the motion information so as to visualize (1) the pseudo-motion of a cat object (pseudo-moving object) around the player P even when the cat object is placed at the end point of the moving path R in the real space when the game has started, (2) the motion of the cat object that changes from the pseudo-motion to the actual state when the cat object moves toward the position at which the cat object is placed in the real space when the player P has advanced a certain distance toward the end point of the moving path R, and is set to the same state as that in the real space, (3) the pseudo-motion of the cat object (e.g., various gestures when the player P has held the cat object) that does not change in the real space, and (4) the motion of the cat object that is synchronized with the movement in the real space when the player P releases the cat object from a held state (when the cat object falls).

The effect control processing section 114 performs a process that controls the various effect device 90 to 93 corresponding to the player's state (including the specific state), the state of the effect moving object, the current game environment, and the state of the game. Specifically, the effect control processing section 114 performs an ON/OFF control process on the effect device 90 to 93, a process that changes the ability of the effect device 90 to 93, or a control process based on a program set in advance.

For example, when the blower 90 is used as the effect device 90 to 93, the effect control processing section 114 performs a drive control process (blow control process) and a stop control process. When a temperature control device is used as the effect device 90 to 93, the effect control processing section 114 performs a temperature control process. When the moving path R is used as the effect device 90 to 93, the effect control processing section 114 controls the effect device 90 to 93 that should be changed corresponding to the state of the player P (e.g., controls a swing unit provided to the moving path R, or controls a vibration unit).

The communication control section 120 performs a process that generates data (mainly image data for presenting the simulation space to the player P) that is transmitted to the HMD 20. The communication control section 120 transmits and receives control signals that control the effect device 90 to 93.

The image generation section 130 performs a drawing process on the basis of the results of various processes (game process) performed by the processing section 101, and various types of information such as the player's state (including the specific state) to generate an image (particularly an image that presents the simulation space to the player P), and outputs the generated image to the HMD 20 through the communication control section 120.

The image generation section 130 acquires object data (model data) that includes vertex data (e.g., vertex position coordinates, texture coordinates, color data, normal vector, or alpha value) with respect to each vertex of the object (model), and performs a vertex process (i.e., a shading process using a vertex shader) on the basis of the vertex data included in the acquired object data (model data).

The image generation section 130 may optionally perform a vertex generation process (tessellation, curved surface division, or polygon division) for subdividing the polygon when performing the vertex process.

When the image generation section 130 performs the vertex process, the image generation section 130 performs a vertex movement process and a geometric process such as a coordinate transformation process (world coordinate transformation process and camera coordinate transformation process), a clipping process, or a perspective transformation process, according to a vertex processing program (vertex shader program or first shader program), and changes (updates or adjusts) the vertex data with respect to each vertex of the object on the basis of the processing results.

The image generation section 130 performs a rasterization process (scan conversion process) on the basis of the vertex data subjected to the vertex process to link the surface of the polygon (primitive) to pixels.

The image generation section 130 then performs a pixel process (i.e., a shading process using a pixel shader, or a fragment process) that draws the pixels that form the image (fragments that form the display screen).

The image generation section 130 implements the pixel process by determining the final drawing color of each pixel that forms the image by performing various processes such as a texture readout (texture mapping) process, a color data setting/change process, a translucent blending process, and an anti-aliasing process, according to a pixel processing program (pixel shader program or second shader program), and outputting (drawing) the drawing color of the object subjected to a perspective transformation process to (in) the storage section 170 (i.e., a buffer that can store image information on a pixel basis (VRAM or rendering target)).

Additionally, the image generation section 130 implements the pixel process by performing a per-pixel process that sets or changes the image information (e.g., color, normal, luminance, and alpha-value) on a pixel basis. The image generation section 130 thus generates an image viewed from the player P in the object space.

The vertex process and the pixel process are implemented by hardware that enables a programmable polygon (primitive) drawing process (i.e., a programmable shader (vertex shader and pixel shader)) based on a shader program written in shading language.

The programmable shader enables a programmable per-vertex process and a programmable per-pixel process to increase the degree of freedom with respect to the drawing process so that the representation capability can be significantly improved as compared with a fixed drawing process using conventional hardware.

The image generation section 130 performs a geometric process, a texture mapping process, a hidden surface removal process, an alpha-blending process, and the like when drawing the object.

The image generation section 130 implements the geometric process by performing a coordinate transformation process, a clipping process, a perspective projection transformation process, a light source calculation process, and the like on the object.

The image generation section 130 stores the object data (e.g., object's vertex position coordinates, texture coordinates, color data (brightness data), normal vector, or alpha-value) subjected to the geometric process (perspective transformation process) in the storage section 170.

The image generation section 130 performs a texture mapping process that maps a texture (texel value) stored in the storage section 170 onto the object. Specifically, the image generation section 130 reads a texture (surface properties such as color (RGB) and alpha-value) from the storage section 170 using the texture coordinates set (assigned) to the vertices of the object, and the like.

Then, the image generation section 130 maps the texture (two-dimensional image) onto the object. In this case, the image generation section 130 performs a pixel-texel link process, a bilinear interpolation process (texel interpolation process), and the like.

The image generation section 130 performs the hidden surface removal process using a Z-buffer method (depth comparison method or Z-test) that utilizes a Z-buffer (depth buffer) that stores the Z-value (depth information) of the drawing pixel.

Specifically, the image generation section 130 refers to the Z-value stored in the Z-buffer when drawing the drawing pixel that corresponds to the primitive of the object. Then, the image generation section 130 compares the Z-value stored in the Z-buffer with the Z-value of the drawing pixel of the primitive. When the Z-value of the drawing pixel is the Z-value in front of the player P (e.g., a small Z-value), the image generation section 130 draws the drawing pixel, and updates the Z-value stored in the Z-buffer with a new Z-value.

Then, the image generation section 130 performs a translucent blending process (e.g., normal alpha-blending process, additive alpha-blending process, or subtractive alpha-blending process) based on the alpha-value (A value).

Note that the alpha-value is information that can be stored so as to be linked to each pixel (texel or dot), such as additional information other than the color information. The alpha-value can be output as mask information, translucency (equivalent to transparency or opacity), bump information, or the like.

The sound generation section 140 performs a sound process on the basis of the results of various processes performed by the processing section 101 with respect to the player's state (including the specific state) and the like to generate a game sound (i.e., an ambient sound (stereophonic sound) in the simulation space) (e.g., background music (BGM), effect sound, or voice), and outputs the generated game sound to the headphone 61 through the HMD 20.

2-6 Player Marker Unit and Imaging Camera

The player marker unit 60 and the imaging camera 70 included in the game system 1 of the present embodiment are described below with reference to FIGS. 1 and 4. For example, in the present embodiment, the imaging camera 70, together with the simulation control device 100, constitutes the detection device of the invention.

In the present embodiment, the marker units 60 are provided to a plurality of parts of each player P in order to detect the player's state (see above). Specifically, in the present embodiment, the marker units 60 are provided to the head, both hands, and both feet of each player P (see FIGS. 1 and 4).

Each marker unit 60 is formed using a material (e.g., reflecting sheet) having a reflecting surface, and each marker unit 60 is formed by a spherical marker. For example, each marker unit 60 reflects the applied light, and emits white light or light in a specific color.

More specifically, the marker units 60 include a head detection marker unit 60a, a right hand or left hand detection marker unit 60b, and a right foot or left foot detection marker unit 60c.

In the present embodiment, a light source unit (not illustrated in the drawings) that applies light to each marker unit 60 is provided in a movement experience area within the structure 10.

The emission color of the marker unit 60 is not particularly limited. When a plurality of players P are simultaneously present in the movement experience area, the emission color of the marker unit 60 may be changed on a player (P) basis, or may be changed on a part basis.

Each imaging camera 70 is placed at a predetermined position within the structure 10 (see FIG. 1, for example). Each imaging camera 70 forms an image of an area captured within the angle of view, and sequentially outputs the image data to the simulation control device 100.

In the present embodiment, each imaging camera 70 is provided outside the moving range (i.e., moving path R) of the player P in the real space.

Each imaging camera 70 is placed so as to be able to image the play area 12, and image each player P who moves within the play area 12 and/or changes the attitude.

In the present embodiment, each imaging camera 70 includes a predetermined image sensor (e.g., CCD), and a lens that has a predetermined focal length. Each imaging camera 70 images an area within a predetermined angle of view at a predetermined focal length, and sequentially outputs the image data to the simulation control device 100.

When the player P can freely move within the play area 12, it is necessary to image the entire play area 12, and each imaging camera 70 is placed so that the entire play area 12 can be imaged.

Each imaging camera 70 must be a color camera when it is desired to detect a colored marker unit 60.

The number and the placement positions of marker units 60 are not limited to those described above. The number and the placement positions of marker units 60 are not basically limited provided that the marker units 60 can be captured using the imaging cameras 70.

2-7 Effect Object and Effect Device

The effect object 80 and the effect device 90 to 93 included in the game system 1 of the present embodiment are described below with reference to FIGS. 1, 3, 4, and 7 to 9.

Figure 7:
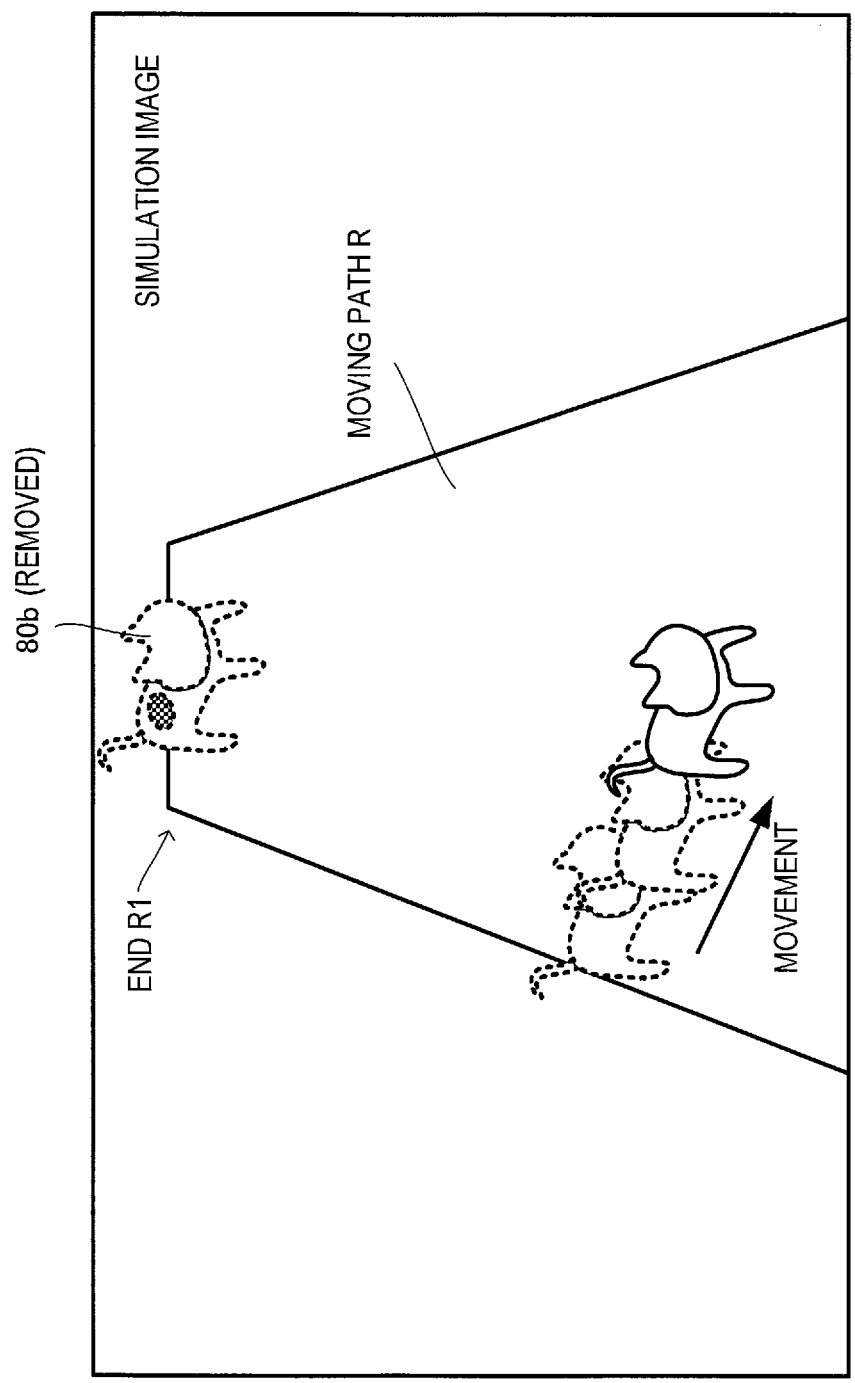
FIG. 7 is a drawing illustrating an effect moving object (pseudo-moving object) according to an embodiment of the invention.
Figure 8B:
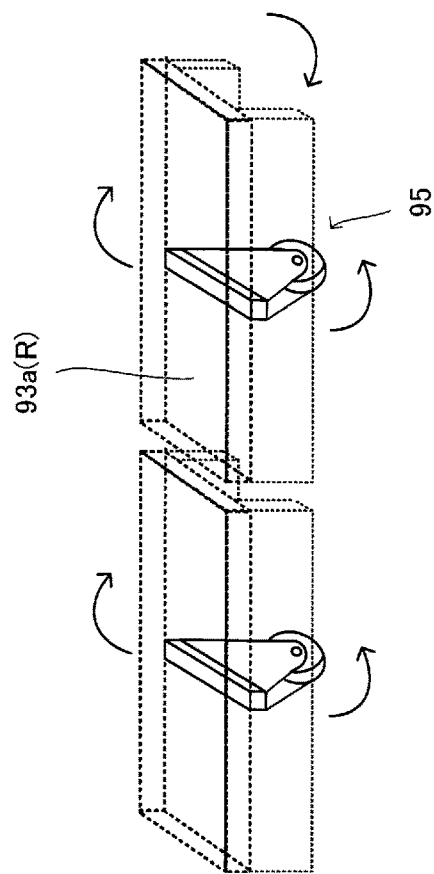
FIG. 8B is a drawing illustrating an example of an effect object and a moving path member (effect device) according to one embodiment of the invention, and illustrates the operations the moving path member.
Figure 8A:
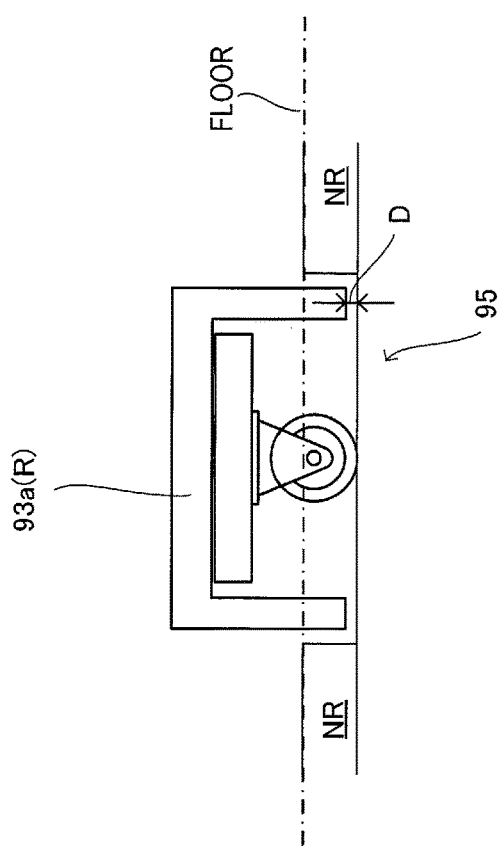
FIG. 8A is a side view illustrating an example of an effect object and a moving path member (effect device) according to one embodiment of the invention.
Figure 9:
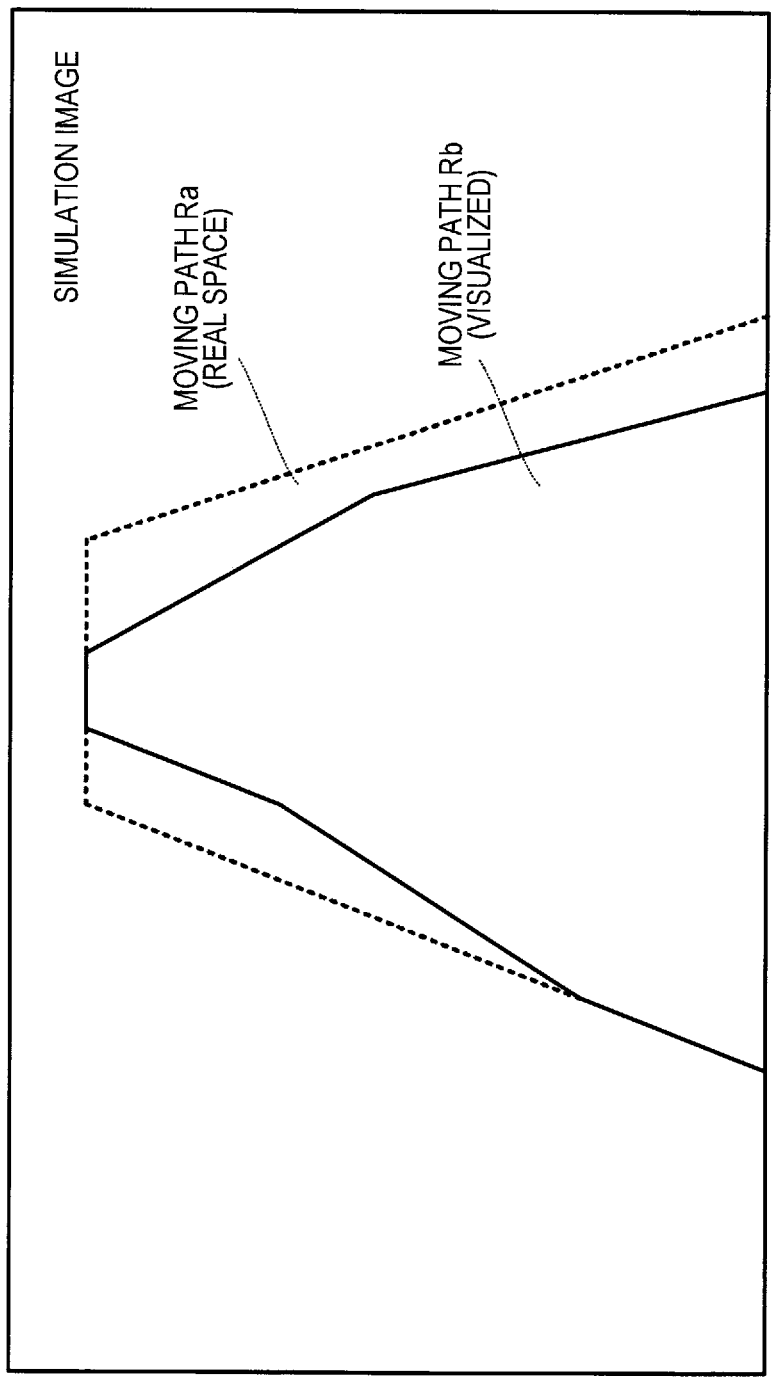
FIG. 9 is an example of a simulation image which the structure or the form of the moving path member (effect device) according to an embodiment of the invention is changed only in simulation space.

FIG. 7 is a drawing illustrating an effect moving object (pseudo-moving object) of the present embodiment. FIG. 8A is a side view illustrating an example of a moving path member (effect device) 93 of the present embodiment. FIG. 8B is a drawing illustrating an example of an effect object and a moving path member (effect device) of the present embodiment, and illustrates the operations the moving path member. FIG. 9 is an example of a simulation image which the structure or the form of the moving path member (effect device) of the present embodiment is changed only in the simulation space. In one example, the effect object and the effect device 90 to 93 of the present embodiment constitute the effect unit of the invention.

In the present embodiment, the effect object 80 and the effect device 90 to 93 are placed in the real space defined by the structure 10, and are configured to perform an effect process that allows the player P to experience a simulation space corresponding to either or both of the player's state and the run state of the simulation (i.e., the game state), and allow the player P to experience a given effect in synchronization with the simulation image.

The effect object 80 and the effect device 90 to 93 are used to allow the player P to experience the simulation space (e.g., outdoor space, indoor space, height (high place), enclosed place, dangerous place, special space, hot place, or cold place), and allow the player P to experience the simulation situation in synchronization with the simulation image to provide an effective simulation.

Specifically, in the present embodiment, the effect object 80 is visualized as the effect moving object in the simulation space, and is visualized in a state that differs from the state of the effect object 80 in the real space corresponding to the user's state, the game state, or the user's state and the game state.

As described above, the effect object 80 includes the effect moving object and the effect stationary object, and the effect moving object includes the true moving object and the pseudo-moving object.

As illustrated in FIG. 7, the pseudo-moving object 80*b* (effect moving object) is placed at the end R1 of the moving path T in the real space. However, the image of the pseudo-moving object 80*b* is removed from the end R1 of the moving path R in the simulation image (the virtual three-dimensional space) corresponding to the player's state (e.g., the position of the player in the real space) and a virtual object that moves in the moving path R is displayed.

Specifically, independent from the state of the effect object 80 in the real space, the simulation control device 100 visualizes a state change of the effect object 80 in the simulation space and generates that state change as the simulation image corresponding to the player's state.

The effect moving object is provided with a marker unit 60*d* for detecting the position of the effect moving object in the real space, the positional relationship between the effect moving object and the player P in the real space, and the state of the effect moving object (i.e., the moving direction and the attitude of the effect moving object).

The simulation control device 100 allows the player P to determine the position and/or the state of the effect moving object in the real space in the same manner as the parts of the player P by imaging the marker unit 60*d* using the imaging camera 70.

For example, the marker unit 60*d* provided to the effect object 80 may be the same as the marker units 60*a*, 60*b*, and 60*c* provided to each part of the player P. Note that it is desirable that the marker unit differ between a plurality of players P and the effect object 80 that appears in the game so as to distinguish the color of the marker units 60*a*, 60*b*, and 60*c* provided to each part of the player P and the stored information.

Note that a vibration unit may be provided in the effect object 80, and the simulation control device 100 may control the vibration of the vibration unit to produce an effect that surprises the player P in synchronization with the simulation image, or independently of the simulation image.

The effect device 90 to 93 are devices that are used to reliably generate the simulation space as a more realistic space, and provide a given effect directly to the player P.

The effect device 90 to 93 include structure-type effect device that is placed in the real space and provides a given effect to the player P due to the placement and the structure in synchronization with the simulation image, and synchronization-type effect device that provides a given effect corresponding to the detected player's state, the game environment, and the state of the game.

Examples of the synchronization-type effect device include the blower 90 illustrated in FIG. 1, and effect device (e.g., temperature control device, illumination device, or vibration device) (not illustrated in the drawings) that forms the environment of the simulation space.

Examples of the structure-type effect device include the moving path member 93 that forms the moving path R, a start block (not illustrated in the drawings) that provides the start point, and a member that allows the player P to experience a touch feeling (e.g., convexities and concavities or a material for a wall surface and a floor) (e.g., the spring floor panel 92 that provides an elevator).

For example, the blower 90 blows air toward the front side of the player P when the player P has entered the movement experience zone 14 from the start zone 13, and blows air toward the front side of the player P from the lower side of the player P when the player P has moved to the moving path R (see FIGS. 1 and 4).

The moving path member 93 includes an effect area 93a that is provided under the moving path R in which the player P moves, and is formed to vibrate or swing corresponding to the simulation image (see FIGS. 3, 8A, and 8B).

Specifically, the moving path member 93 in the effect area 93a is formed to have a different height (height in the direction toward the ceiling) with respect to the floor (non-moving path NR) of the structure 10 (see FIG. 8A).

The moving path member 93 in the effect area 93a includes a plurality of driver units 95 that vibrates or swings the effect area on the basis of a given condition (e.g., the player P has started walking on the moving path member 93).

Each driver unit 95 includes a wheel 96 that rotates in the direction orthogonal to the moving path direction (travel direction of the player P) (the moving path member 93 is horizontal to the floor), and a support plate 97 that supports the moving path member 93 and that has a gap D having a predetermined height (e.g., about 5 mm) from the surface with which the wheel 96 comes in contact.

The driver units 95 are disposed adjacently to each other in the effect area 93a along the moving path R.

The moving path member 93 in the effect area 93a may be configured so that the entire moving path R is formed by the driver unit 95, or may be configured so that the moving path R is formed by the driver unit 95 and the moving path member 93 that is not driven. FIG. 8B illustrates an example in which the driver units 95 continuously form the moving path R.

The driver units may be configured to vibrate or swing independently (see FIGS. 8A and 8B), or may be configured so that the vibration motion and the swing motion are mechanically controlled by the effect control processing section 114.

The structure or the form of the effect device may be changed only within the simulation space. Specifically, the structure or the form of the effect object and the effect device may be changed only within the simulation space without changing in the real space.

For example, when a predetermined event has occurred, the image generation section 130 may change the structure or the form of the effect object and the effect device (i.e., reduce the width of the moving path member 93, move the wall 17 toward the player P, or move the ceiling 15 downward) only within the simulation space (see FIG. 9).

Note that, in FIG. 9, the moving path Ra drawn using dotted lines represents the moving path R formed in the real space, and the moving path Rb drawn using solid lines represents the moving path R visualized in the simulation image.

3. FEAR OF HEIGHTS EXPERIENCE GAME 3-1 Outline of Fear of Heights Experience Game The fear of heights experience game implemented in the game system 1 of the present embodiment is described below in detail.

The game system 1 of the present embodiment is configured to mask each eye of the player and implement an experience-type game in which a player is presented with an image of virtual three-dimensional space using the non-see-through HMD 20, and the player moves within a narrow moving path provided at a height (high place).

Specifically, the game system 1 of the present embodiment provides a fear of heights experience game (see FIG. 2). In this fear of heights experience game, the player is exposed to a fear of falling from a height (high place), is presented with events (e.g., various effects and missions) that intensify that fear, and starts from the start zone 13, moves along the narrow moving path R that has a predetermined length, and returns to the start zone 13 within a time limit.

That is, the game system 1 of the present embodiment can provide an engaging experience-type game in a simulation space linked to the real space in which the game progresses while the player clears obstacle effects such as walking obstacles (including surprises and obstacles that impede smooth walking), and completes events (e.g., missions).

The game system 1 of the present embodiment is configured to (1) detect, during the game, the player's state (including the position and the attitude of the player P in real space) on the basis of the position and the time of stay of each part of the player P, (2) reference the game environment or the state of the game (including the state of the effect object in the real space) to determine that the player P is in the specific state in the simulation space (virtual three-dimensional space) when the detected player's state has satisfied a given condition, and (3) execute an effect or an event related to a mission based on the specific state that includes the simulation image.

The game system 1 of the present embodiment determines, on the basis of an event occurrence condition stored in advance in the data buffer 176 and the detected player's state, the following as the specific state:

(A) a state in which a mission during the game is failed (hereinafter referred to as "mission fail state"), and (B) a state that generates a predetermined event (hereinafter referred to as "event generation state").

Thus, when the game system 1 of the present embodiment references the game environment or the state of the game to determine whether or not the player is in the specific state, and it is determined that the player is in the specific state, the game system 1 implements events and effects. As a result, a game is implemented that allows a player to be provided with a more realistic experience, even in a pseudo-space, and the player is provided with an engaging experience-type game.

3-2 Specific State and Event (Effect) Implemented on the Basis of the Specific State The specific state and the event implemented on the basis of the specific state during the fear of heights experience game implemented in the game system 1 of the present embodiment is described below in detail.

While presenting the simulation image and reproducing environment sounds in the simulation space, the game system 1 of the present embodiment determines whether or not the player is in the specific state (the mission fail state and the event generation state) from a preparation stage after the player puts on the HMD 20 to when the game is completed or to when the game is not completed and is terminated prematurely. When it is determined that the player is in the specific state, various events (including effects such as the generation of a simulation image) are implemented.

The game system 1 of the present embodiment is configured to determine, at a predetermined timing (e.g., every 5 ms), the following as the mission fail state in which the player has failed the mission in the fear of heights experience game:

(1) a fall state (hereinafter referred to as "player fall state") indicating that the player P has run off the moving path R (i.e., when the player P has fallen from a height (high place)), and (2) a state in which the cat object (effect object 80) gets away while being rescued (including a state in which the object is dropped (hereinafter referred to as "object drop state")).

The game system 1 implements an effect in which the player P falls from the moving path R and terminates the game when it is determined that the player P is in the player fall state, and implements an effect in which the effect object 80 falls and the scaffolding of the moving path R collapses and terminates the game when it is determined that the player P is in the object drop state.

In the present embodiment, the game system 1 determines whether or not the player's state corresponds to a state that is stored in advance, and implements a variety of predetermined events during the fear of heights experience game (including events linked to the corresponding states).

For example, the game system 1 links the player's state to the following events ((1) to (5)) and implements various predetermined events during the fear of heights experience game when it is determined that the player is in a predetermined state:

(1) an event in which, while the player P moves from the start zone 13 on the moving path R, the cat object (effect object 80) psuedo-moves only in the virtual three-dimensional space from a predetermined position on the start zone 13 side of the moving path R to the position where the effect object 80 is placed in the real space (hereinafter referred to as "cat object moving event"), (2) a capture event in which the player P captures the cat object (effect object 80) situated at the end of the moving path R when the player P has reached the end of the moving path R (hereinafter referred to as "cat object capture event"), (3) an effect event in which the moving path R narrows while the player P returns to the start zone 13 along the moving path R (hereinafter referred to as "scaffolding collapse event"), (4) an effect event in which the blower 90 blows at a predetermined timing while the player P is moving along the moving path R (hereinafter referred to as "blowing event"), and (5) an effect event in which the moving path R swings at a predetermined timing while the player P is moving along the moving path R (hereinafter referred to as "scaffolding swing event"), Note that, in the scaffolding swing event, the swinging of the moving path member 93 is controlled by the effect control processing section 114.

3-3 Detection of Player's State

Figure 10B:
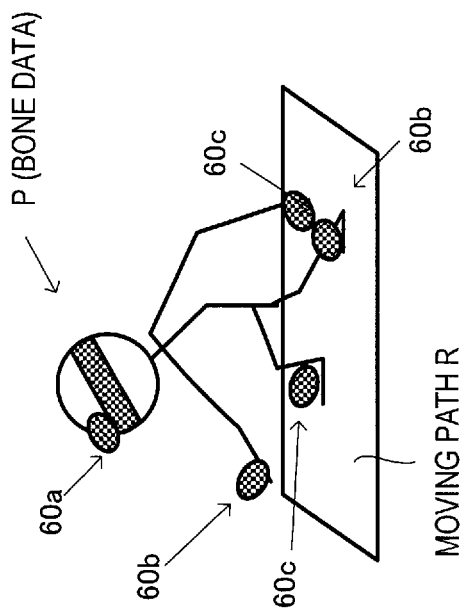
FIG. 10B is a drawing illustrating the attitude of a player when detecting the player's state by a state detection processing section according to an embodiment of the invention.
Figure 10C:
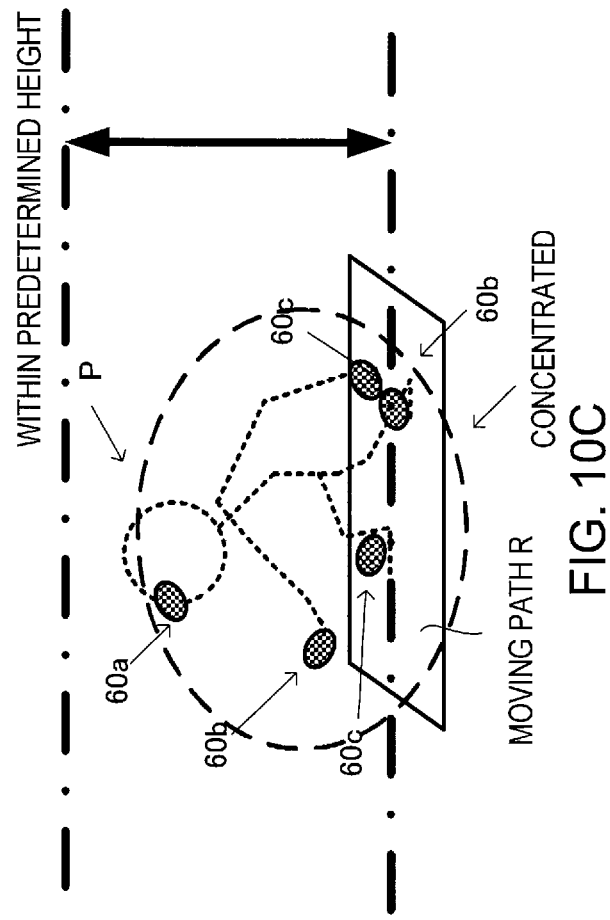
FIG. 10C is a drawing illustrating an example of a player's state detected by a state detection processing section according to an embodiment of the invention, wherein detection of the attitude of a crouching player is depicted.
Figure 10A:
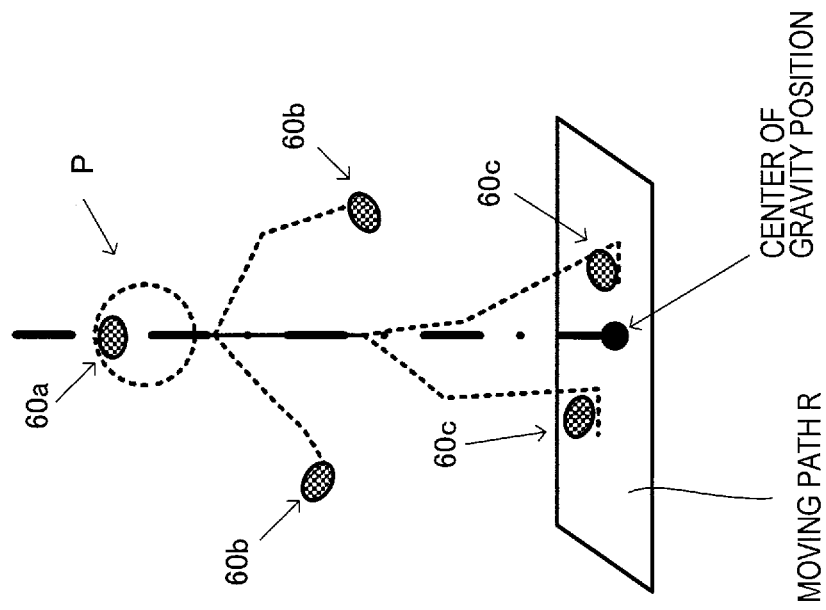
FIG. 10A is a drawing illustrating the detection of a player's position (player's state) by a state detection processing section according to an embodiment of the invention.
Figure 11B:
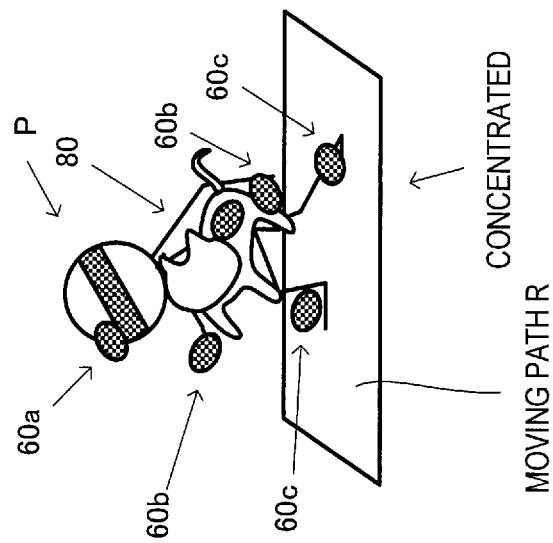
FIG. 11B is a drawing illustrating an example of a player's state detected by a state detection processing section according to an embodiment of the invention, wherein an example in which the player is near the effect object and has assumed a crouched attitude is depicted.
Figure 11A:
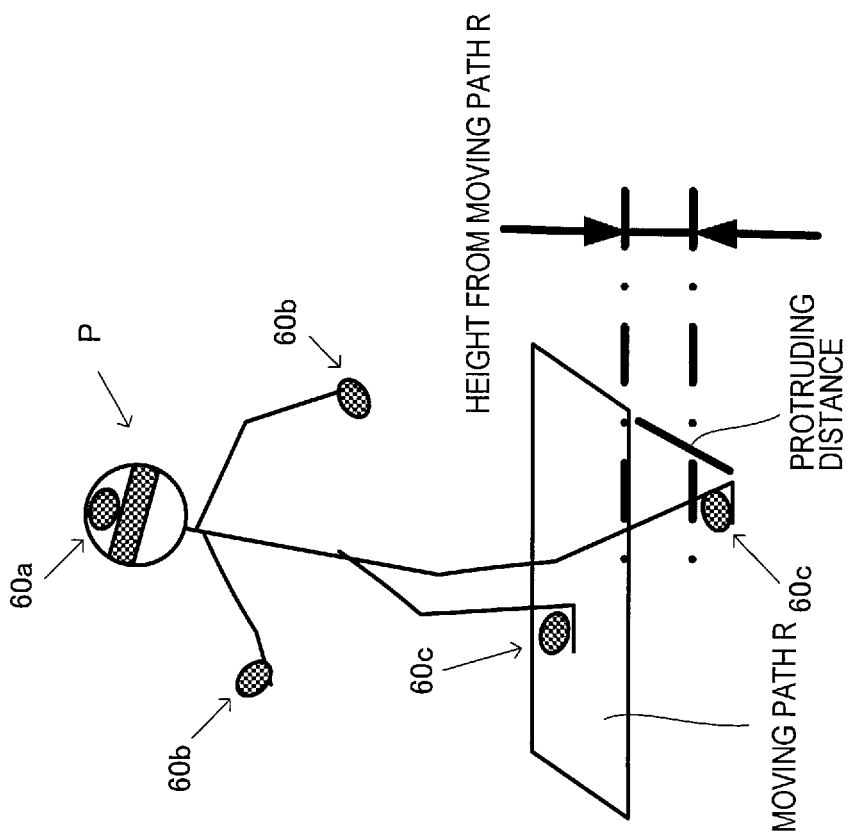
FIG. 11A is a drawing illustrating an example of a player's state detected by a state detection processing section according to an embodiment of the invention, wherein an example of attitude of the player when the player falls is depicted.

Next, an example of a player's state detected by the state detection processing section 112 of the present embodiment will be described while referencing FIGS. 10A, 10B, 10C, 11A, and 11B. FIG. 10A is a drawing illustrating the detection of the player's position (player's state) by the state detection processing section 112 of the present embodiment. FIG. 10B is a drawing illustrating the attitude of the player when detecting the player's state by the state detection processing section 112 of the present embodiment. FIG. 10C is a drawing illustrating an example of the player's state detected by the state detection processing section 112 of the present embodiment, wherein detection of the attitude of a crouching player is depicted. FIG. 11A is a drawing illustrating an example of the player's state detected by the state detection processing section 112 of the present embodiment, wherein an example of attitude of the player when the player falls is depicted. FIG. 11B is a drawing illustrating an example of the player's state detected by the state detection processing section 112 of the present embodiment, wherein an example in which the player is near the effect object and has assumed a crouched attitude is depicted.

Basic principle for detecting player's state (position and attitude) As described above, the state detection processing section 112 detects a part feature (quantity) (e.g., the position (positional coordinates in the real space) of each part, the direction of each part, the shape (planar shape or stereoscopic shape) of each part, or the color (including gray scale) of each part) on the basis of image data related to the each of the plurality of marker units 60 captured by the plurality of imaging cameras 70, and detects the player's state including the position (center of gravity position) and the attitude of the player corresponding to the detected part feature (quantity).

The state detection processing section 112 detects, from the image data, pieces of part (e.g., head, both hands, or both feet) information (e.g., position and direction) needed to detect the position and the attitude of the player P, and detects the position and the attitude in the real space as the player's state on the basis of the plurality of part information in the various image data detected using the imaging cameras 70.

More specifically, the state detection processing section 112 detects, as the position of the player included in the player's state, the center of gravity position of the player P from the positions of each part in the real space (positional coordinates in the real space) on a player P basis.

For example, for a player P moving in the moving path R (see FIG. 10A), the state detection processing section 112 detects, as the position of the player P included in the player's state, the center of gravity position that is the center of the planar positions of the parts in the real space.

The state detection processing section 112 generates bone data formed from each part on the basis of the part information related to the position and the direction of each part, and detects the attitude of the player P from the bone data. Specifically, the state detection processing section 112 detects the attitude of the player P (e.g., if the player P is crouching while walking, is falling or has fallen down, is holding the cat object, or has dropped the cat object).

More specifically, the state detection processing section 112 generates bone data on the basis of the position and the direction of the head and the position of each hand and foot, and detects the attitude of the player P on the basis of the generated bone data.

For example, the state detection processing section 112 generates bone data on the basis of the position and the direction of the head and the position of each hand and foot, and detects the attitude of the player P on the basis of the generated bone data (see FIG. 10B).

The state detection processing section 112 may directly detect the player's state on the basis of the position and the direction of the head and the position of each hand and foot, without generating the bone data.

For example, FIG. 10C illustrates a case in which the positions of each part (including the head) in the real space are concentrated within a predetermined area, and the position of the head is lower than a predetermined height. In this case, the state detection processing section 112 detects that the player P has assumed a crouching attitude.

When, for example, it is possible to detect the attitude of the player P (e.g., the player P is falling) on the basis of part information related to a reference part, the state detection processing section 112 of the present embodiment may directly detect the player's state without generating the bone data.

For example, FIG. 11A illustrates a case in which one foot is lower than the height of the moving path R and the distance that this foot protrudes from the moving path R (hereinafter referred to as "protruding distance") is a greater than or equal to a predetermined distance. In this case, the state detection processing section 112 detects that the player P has assumed a falling attitude.

Note that these determinations are given by way of example and the state detection processing section 112 of the present embodiment detects the state of the player P including various other attitudes of the player P.

Player state based on positional relationship between player and effect object The state detection processing section 112 detects the player's state on the basis of the player's state described above and also on the basis of the positional relationship between the effect object 80 and the player P in the real space.

More specifically, the state detection processing section 112 determines whether or not the player and the effect object 80 and the moving path member 93 that are placed in the real space and are visualized in the simulation image as objects are in a given positional relationship in the real space, and detects the player's state on the basis of the determination result.

For the effect object 80 that moves in the real space, the state detection processing section 112 determines that the player P is in contact with the effect object 80 and detects that the player P is in a state (i.e., attitude) of holding the effect object 80 when the positional coordinates of the effect object 80 in the real space, detected by means of the marker unit 60 provided to the effect object 80, and the part information (e.g., positional coordinates in the real space) about each part of the player P are within a predetermined range.

For example, FIG. 11B illustrates a case in which the player P has assumed a crouching attitude and is near the effect object 80. In this case, each part of the player P and the position of the effect object 80 are within the predetermined range.

In this case, the state detection processing section 112 detects an attitude (player's state) in which the player P is holding the effect object 80.

Detection of player's state based on positional relationship between player and virtual moving path During the simulation, in order to intensify the fear of heights, there are cases in which the visualized effect unit (specifically, the moving path member 93) is visualized in a state that is different from the state in the real space (e.g., the width of the moving path R in the real space is narrower in the simulation space) (see FIG. 9).

Typically, when the width of the moving path R formed in the real space and the width of the moving path visualized in the simulation space are the same (when there is similarity therebetween), the detected player's state and the state in the real space of the player P correspond to each other and, as such, provided that the player's state can be detected, this player's state can be used as the player's state in the simulation space.

However, when the state of the effect unit to be visualized (specifically, the moving path member 93) is visualized in the simulation space different from the state of the effect unit in the real space, the player P will feel as if off the moving path in the simulation space, even when on the moving path R in the real space.

Therefore, in this case, the state detection processing section 112 detects the relationship in the simulation space between the part of the player and the virtual moving path linked to the moving path R on the basis of specific part information that is detected (specifically, the foot part), and detects the player's state with respect to the virtual moving path on the basis of the detected relationship.

More specifically, the state detection processing section 112 detects the positional coordinates of the virtual moving path linked to the moving path R and, on the basis of the positional coordinates in the real space of the foot of the player P and the detected positional coordinates of the virtual moving path, detects the correlation between the foot of the player P and the virtual moving path as the relationship in the simulation space between the part (i.e., foot) of the player P and the virtual moving path linked to the moving path R.

The state detection processing section 112 detects, as the correlation between the foot of the player P and the virtual moving path, either or both of the time that the foot of the player P is separated from the virtual moving path, and the distance (planar distance, linear distance, and distance in height (falling) direction) in the virtual space between the foot of the player P and the virtual moving path.

When the time that the foot of the player P is separated from the virtual moving path is short, it can be determined that the player P has lost and then regained his/her balance (i.e., is in a normal walking state). When the time that the foot of the player P is separated from the virtual moving path is greater than or equal to a predetermined time, it can be determined that the player P is in a continuously unbalanced state and, if that state continues, it can be determined that the player P has fallen from the moving path.

When the distance between the foot of the player P and the virtual moving path is short, it can be determined that the player P is in a state of normal movement during the game, or has lost and then regained his/her balance (i.e., is in a normal walking state). When the distance is long, it can be determined that the player P is in a continuously unbalanced state and, if that state continues, it can be determined that the player P has fallen from the moving path.

Therefore, the state detection processing section 112 is configured to detect the player's state with respect to the virtual moving path by detecting the time and/or the distance, as described above.

More specifically, for the time that the foot of the player P is separated from the virtual moving path, the state detection processing section 112 measures the time that one foot is separated from the virtual moving path and, when the time that the foot is continuously separated from the virtual moving path is determined to be greater than or equal to a predetermined time, the state detection processing section 112 detects, as the player's state, that the player P has assumed a posture of falling from the virtual moving path (hereinafter referred to as "falling posture").

For the distance in the virtual space between the foot of the player P and the virtual moving path, the state detection processing section 112 calculates one or more of a planar distance formed from lateral direction (direction parallel to the floor surface of the structure 10) components in the real space and the simulation space, a linear distance between the position of the foot and a predetermined position on the virtual moving path, and a distance formed from a height direction (direction perpendicular to the floor surface of the structure 10) component representing the falling direction. When one or more of the distances is greater than or equal to a predetermined distance, the state detection processing section 112 detects, as the player's state, that the player P has assumed the falling posture.

In the present embodiment, from the viewpoint of the game content, the distance in the height direction is treated with importance when detecting a fall from the virtual moving path. When multiple elements are used to detect the player's state and it is detected that the player P has assumed the falling posture from the virtual moving path on the basis of two or more distances in the virtual space between the foot of the player P and the virtual moving path, on the basis of the time that the foot of the player P is separated from the virtual moving path, or the like, the weighting of the height direction element representing the falling direction is made greater than the weighting of the other elements.

In one example, the state detection processing section 112 calculates the distance in the virtual space between the foot of the player P and the virtual moving path using the center position of the foot and the position on the virtual moving path that is closest to the center of gravity position of the player P.

Data that forms the determination criteria of the distance or the time (i.e., threshold data) is stored in advance in the data buffer 176, and the state detection processing section 112 appropriately reads out this data to perform the calculations.

Furthermore, when the player's state is detected using multiple elements (e.g., the time and the distance), the state detection processing section 112 may perform function calculation using weighting to determine whether or not a predetermined condition (e.g., if greater than or equal to a predetermined threshold) is satisfied and detect the player's state.

3-4 Determination of Specific State

Next, the determination of the player being in the specific state, performed by the state detection processing section 112 of the present embodiment, will be described.

As described above, the state detection processing section 112 references the data stored in advance in the data buffer 176 and determines whether or not the detected player's state is a predetermined specific state (i.e., the mission fail state (including the player fall state and the object drop state), and the event generation state) in the progression of the game.

The state detection processing section 112 proceeds with the game in accordance with the determination result and also instructs the effect control processing section 114, the image generation section 130, and the sound generation section 140 to implement the corresponding effect.

The state detection processing section 112 determines, in parallel, the mission fail state (including the player fall state and the object drop state) and the event generation state.

Note that, in the present embodiment, a condition related to the determination of the specific state of the player is stored in advance in the data buffer 176, and the state detection processing section 112 uses this data to determine whether or not the player is in the specific state.

Mission Fail State 1 (Player Fall State)

Upon detecting the player's state (including the detected position and the attitude of the player P in the real space), the state detection processing section 112 determines whether or not the player P is in the player fall state.

The state detection processing section 112 determines whether or not the detected position (e.g., the center of gravity position) of the player P in the real space, and/or the attitude (the position of each part and the time of stay or bone data) of the player P in real space is in the player fall state The state detection processing section 112 determines that the player P is in the player fall state by using the position of one or more parts and the time of stay of the part at a specific position, or one or more positional relationship between parts (e.g., a positional relationship between the parts of the player P, or the height in the real space of one foot and the time of stay at that position).

Specifically, as described above, the state detection processing section 112 is configured to determine that the player P is in the player fall state when (1) a determination is performed as to whether or not the detected position (e.g., the center of gravity position) of the player P is within the moving path R in the real space or, when the width of the moving path R is narrowed in the simulation space, whether or not the detected position of the player P is within the range of the narrowed moving path R (hereinafter referred to as "virtual moving path range"), and it is determined that the position of the player P is not on the moving path R or not within the virtual moving path range, (2) it is determined that the player P has assumed a posture in the moving path R (including the virtual moving path range) that suggests, by means of the position of one or more parts, that the player P has fallen (e.g., when the head of the player P is at a position lower than both feet of the player P, or when both hands are separated a predetermined distance in the horizontal direction (e.g., ⅔ or greater of the height of the player P) from both feet and the positions of both hands are in the area of the non-moving path NR), (3) one or more part has remained at a position for a given amount of time or longer that suggests that the player P has fallen (e.g., when it is determined that none of the parts of the player P are in contact with the moving path R (including the virtual moving path range) for a predetermined amount of time), (4) one or more positional relationship between parts satisfies a condition that suggests that the player P has fallen (e.g., one foot is at a position lower than the surface on which the moving path R is provided and is separated a predetermined distance (½ or greater of the height of the player P) in the planar direction and in the height direction (the direction of the floor from the moving path R of the structure 10) from the other foot), or (5) the player's state based on the virtual moving path is determined to be in a posture that suggests that the player P has fallen.

With regards to the determinations described above, the state detection processing section 112 may change the determination criteria and/or the determination conditions depending on the game environment (e.g., the level of the player P (e.g., advanced player or beginner player), or an attribute of the player (e.g., gender, age, height)) or depending on the state of the game (e.g., when the movement speed of the player P is a certain speed or faster, when the time limit is near, or when it is taking time to capture the cat object).

For example, when the player P is a beginner, the state detection processing section 112 may lower the determination level related to the player fall state (e.g., reduce the distance difference (reduce the threshold) used to determine the positional relationship between the parts of the player P).

Mission Fail State 2 (Object Drop State)

The state detection processing section 112 determines whether or not the player's state (including the position and the attitude of the player P in the real space) is in the object drop state on the basis of the detected state of the effect object 80 set to be rescued as the mission (hereinafter referred to as "rescue target object").

The state detection processing section 112 determines whether or not the detected position of the player P in the real space (e.g., position of the center of gravity), the attitude of the player P (specifically, the positional relationship between the parts of the player P, the time of stay of one or more part at a specific position, or one or more positional relationship between the parts), and both the position in the real space and the attitude of the player P are in the object drop state on the basis of the state (specifically, the position in the real space) of the rescue target object that is being held.

Specifically, the state detection processing section 112 is configured to determine that the player P is in the object drop state when (1) the position in the real space of the rescue target object detected by the state detection processing section 112 is separated a predetermined distance (e.g., 30 cm or greater) from a previously detected position (e.g., the previous frame), and the position (e.g., the center of balance position) of the player P is separated a predetermined distance (e.g., 30 cm or greater) from the rescue target object, (2) it is determined, on the basis of the positions of the parts (e.g., one hand of the player P is above the head of the player P and the other hand is over the body of the player P (the parts are separated a certain distance)), that the attitude of the player P is such that it is not possible to hold the rescue target object, or (3) both hands of the player P are separated a predetermined distance (e.g., 50 cm) from the position of the rescue target object in the real space.

As with the player fall state, with regards to the determinations described above, the state detection processing section 112 may change the determination criteria and/or the determination conditions depending on the game environment (e.g., the level of the player P (e.g., advanced player or beginner player), or an attribute of the player (e.g., gender, age, height)) or depending on the state of the game (e.g., when the movement speed of the player P is a certain speed or faster, when the time limit is near, or when it is taking time to capture the cat object).

For example, when the player P is a beginner, the state detection processing section 112 may lower the determination level related to the object drop state (e.g., reduce the distance difference (reduce the threshold) used to determine the positional relationship between the parts of the player P).

Event Generation State

The state detection processing section 112 determines whether or not the player (including the detected position and attitude in the real space of the player P) is in a predetermined event generation state on the basis of the game environment and the state of the game every predetermined timing (e.g., 5 ms), and optionally in accordance with the state of the effect object 80 (e.g., the rescue target object).

More specifically, for the cat object moving event, the scaffolding collapse event, the blowing event, and the scaffolding swing event, the state detection processing section 112 determines that the player P is in the event generation state when it is determined that the position (specifically, the center of gravity position or the position of the part leading in the travel direction) of the player P in the real space (represented by the player's state) has arrived at a predetermined position within the moving path R.

For the cat object capture event, the state detection processing section 112 is configured to determine that the player is in the event generation state related to the cat object capture event when (1) the position of the player P in the real space (represented by the player's state) (specifically, the center of gravity position or the position of a predetermined part (e.g., a hand or the head)) has reached the end of the moving path R, and (2) it is determined that the player P has assumed a crouched attitude and that there is a predetermined positional relationship between the positions in the real space of both hands of the player P and the position in the real space of the object to be captured (i.e., it is determined, via contact determination, that the player P has come in contact with the object to be captured).

For the blowing event, the state detection processing section 112 determines that the player P is in the event generation state related to the blowing event when it is determined that the player P has assumed a specific attitude (e.g., the position of the head is lower than a predetermined height, or one foot is greatly separated from the other foot), thereby forcing the player P into the player fall state (i.e., increasing the difficulty of the game to prevent the player P from completing the game).

Likewise, for the scaffolding swing event, the state detection processing section 112 determines that the player P is in the event generation state related to the scaffolding swing event when it is determined that the player P has assumed an unbalanced attitude (e.g., the positional relationship between parts changes greatly in a short period of time), thereby forcing the player P into the player fall state.

With regards to the determinations described above, the state detection processing section 112 may change the determination criteria and/or the determination conditions depending on the game environment (e.g., the level of the player P (e.g., advanced player or beginner player), or an attribute of the player (e.g., gender, age, height)) or depending on the state of the game (e.g., when the movement speed of the player P is a certain speed or faster, when the time limit is near, or when it is taking time to capture the cat object).

For example, the state detection processing section 112 may reduce the difficulty of the game when the player P is a beginner by reducing the number of blowing events, or the like.

Regarding the determinations described above, the state detection processing section 112 may change the determination criteria and/or the determination conditions according to the state of the effect object (e.g., generate an event for narrowing the width of the moving path R, or increase the number of blowing events) when the player P is holding the rescue target object.

3-5 Other

Other matters related to the fear of heights experience game of the present embodiment are described below.

When it has been determined, on the basis of the player's state, that the player P has fallen down, the state detection processing section 112 terminates the game, displays a fall warning on the HMD 20, outputs an alarm to the headphone 61, and issues a notification to the administrator (not illustrated in the drawings).

In the example described above, the determination criteria of the determination process related to the specific state is changed in accordance with the game environment and/or the state of the game. However, changes related to the effect control of the effect object 80 or the various effect device 90 to 93 (i.e., effect changes) may be implemented in accordance with the game environment and/or the state of the game.

For example, the blowing start timing and the strength of the blowing may be changed in accordance with the moving speed of the player P, and the moving form in the simulation image of the pseudo-moving object may be changed in accordance with the timing at which the player P moves and/or the timing at which the player P crouches.

4. OPERATION OF GAME SYSTEM

4-1 Main Operation

Figure 12:
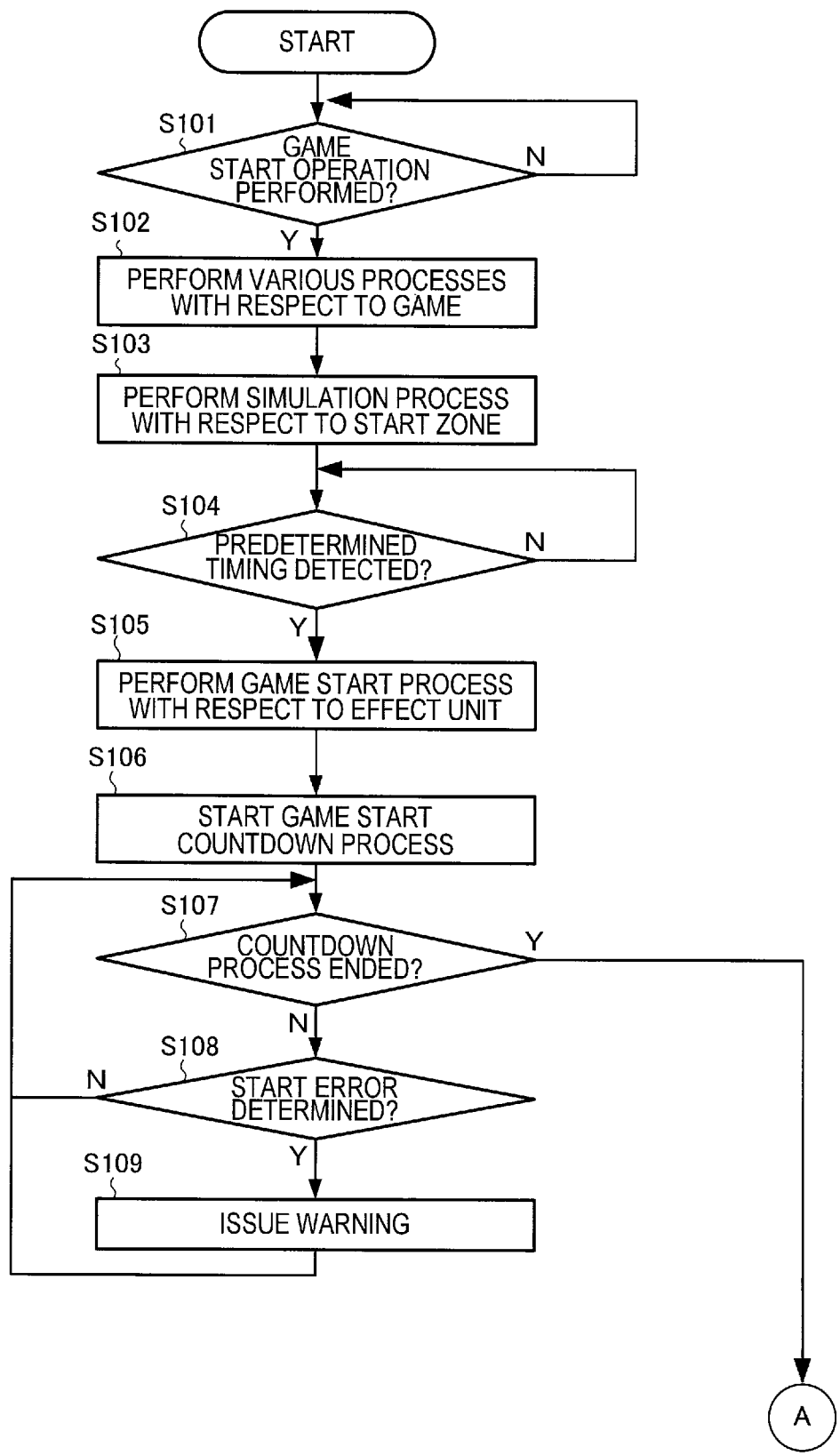
FIG. 12 is a first flowchart illustrating the operation of a game system according to an embodiment of the invention.
Figure 13:
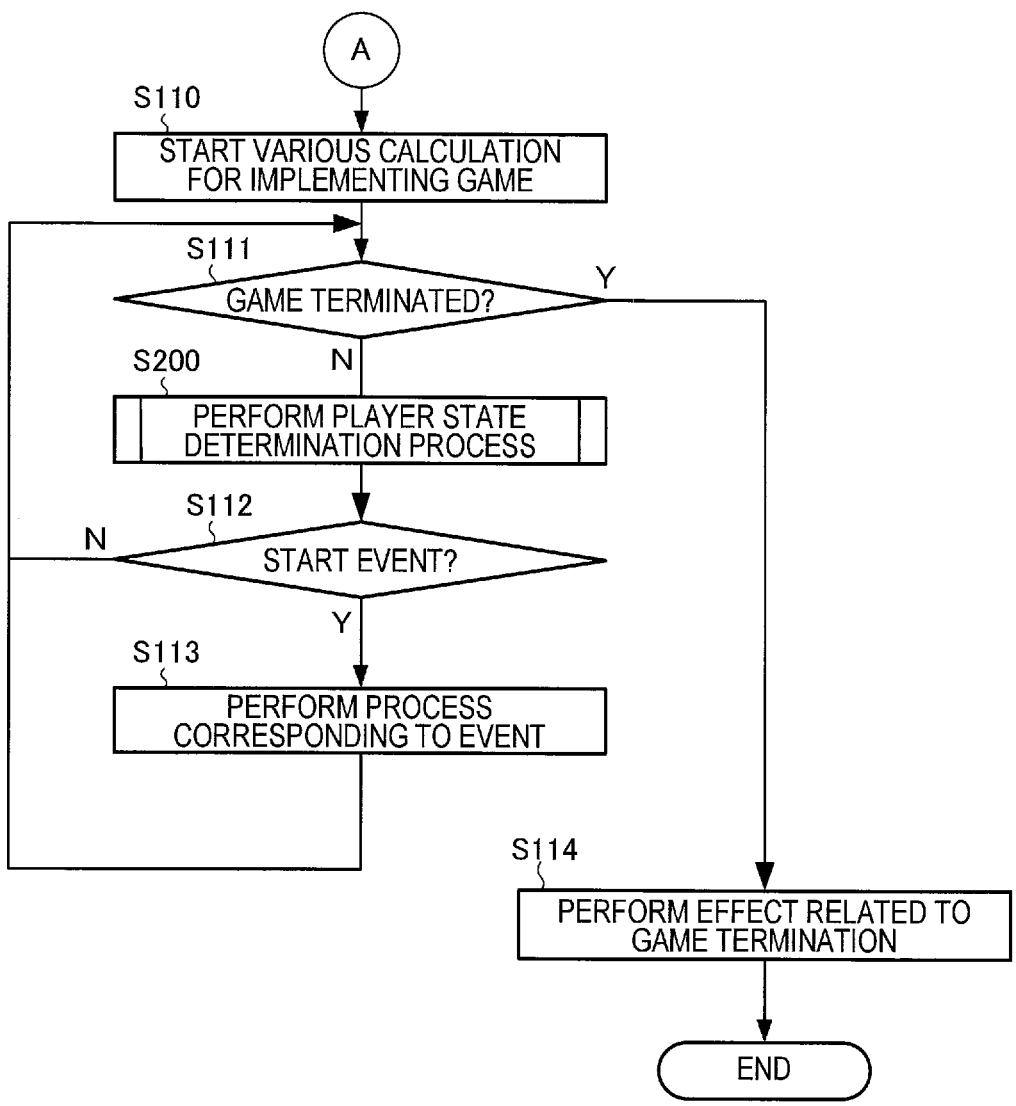
FIG. 13 is a second flowchart illustrating the operation of a game system according to an embodiment of the invention.

The operation of the game system 1 of the present embodiment is described below with reference to FIGS. 12 and 13. FIGS. 12 and 13 are flowcharts illustrating the operation of the game system 1 of the present embodiment.

The operations are described below taking an example of a fear of heights experience game that allows the player to experience a fear of heights. The fear of heights experience game is a game in which the player P starts from the start zone 13, moves along the moving path member 93 having a predetermined width, holds (rescues) the effect object 80 (e.g., cat) that is situated at the end point (i.e., a point situated away from the start zone 13) of the moving path member 93, and returns to the start zone 13 within the time limit.

The player P puts on the HMD 20 and the fall prevention unit 40 (i.e., necessary hardware) before starting the game.

The game calculation section 110 detects whether or not a button (not illustrated in the drawings) has been pressed (i.e., whether or not the game has been started) on the basis of an operation performed by the administrator on condition that the player P wearing the HMD 20 and the fall prevention unit 40 is situated at a predetermined position (i.e., within the start zone 13) (step S101).

In step S101, the game calculation section 110 may detect whether or not the game has been started by detecting the player's state using the state detection processing section 112, and detecting whether or not the player P is situated at the predetermined position.

The game calculation section 110 performs various calculations with respect to the fear of heights experience game, and the object space setting section 111, the state detection processing section 112, the movement-motion processing section 113, the effect control processing section 114, the image generation section 130, and the sound generation section 140 respectively perform a simulation process with respect to the fear of heights experience game (step S102).

More specifically (1) at a predetermined timing (e.g., 5 ms), the state detection processing section 112 starts to detect the marker units 60 provided to each part of the player P and the effect object 80, and starts to detect the player's state and the state of the effect object 80, (2) the object space setting section 111 and the movement-motion processing section 113 start to generate the simulation space viewed from the player P corresponding to the player's state (including the determined specific state), the state of the effect object 80, the game environment, and the state of the game, (3) the effect control processing section 114 starts to control the corresponding effect device (blower 90, automatic door 91, and spring floor panel 92) according to the player's state (including the determined specific state), the state of the effect object 80, the game environment, and the state of the game, and (4) the image generation section 130 and the sound generation section 140 respectively generate the simulation image and the sound corresponding to the simulation image in accordance with the player's state, the state of the effect object 80, the game environment, and the state of the game.

Note that each process in step S102 is continuously performed until it is determined that the game has ended.

The image generation section 130 displays the image within the elevator on the HMD 20, and the effect control processing section 114 controls the spring floor panel 92 in the start zone 13, and performs the simulation process with respect to the start zone 13 (step S103).

When the effect control processing section 114 has detected a predetermined timing (i.e., the end of the simulation process in the start zone 13) (step S104), the effect control processing section 114 performs the game start process (step S105), and the game calculation section 110 starts the game start countdown process (step S106).

For example, as the game start process, the effect control processing section 114

(1) stops controlling the spring floor panel 92, (2) sets the automatic door 91 (i.e., elevator door) provided between the start zone 13 and the movement experience zone 14 from the closed state to the open state, and (3) performs the blowing process using the blower 90 (i.e., controls the corresponding effect device).

Next, the game calculation section 110 detects whether or not the countdown process has ended (step S107), and the state detection processing section 112 performs a process that determines whether or not the player P has moved to the movement experience zone 14 from the start zone 13 (hereinafter referred to as "start error determination process") (step S108).

When the state detection processing section 112 has determined that the player P has moved to the movement experience zone 14 from the start zone 13 before the countdown process has ended, the state detection processing section 112 issues a warning using the HMD 20 (step S109), and performs step S107.

Note that, the state detection processing section 112 may performs step S105 again after producing an effect (e.g., suspending the game start motion), or may suspend the game.

When the game calculation section 110 has detected that the countdown process has ended, the game calculation section 110 starts various calculations for implementing the fear of heights experience game (step S110). Specifically, the game calculation section 110 starts to perform the time limit count process, and starts the determination process with respect to the game termination process.

Next, the game calculation section 110 determines whether or not the game termination condition has been satisfied (step S111). More specifically, the game calculation section 110 determines whether or not the player's state or the state of the effect object 80 has satisfied the termination condition in cooperation with the state detection processing section 112, and determines whether or not the time limit has been reached 0.

For example, the game calculation section 110 determines whether or not the specific state that satisfies the termination condition has occurred (e.g., whether or not the player P has run off the moving path R, or whether or not the effect object 80 to be rescued has fallen during movement) on the basis of the detected player's state.

When the game calculation section 110 has determined that the game termination condition has not been satisfied, the state detection processing section 112 performs player state determination process corresponding to the game environment and the state of the game (step S200) and determines whether or not the player is in the specific state on the basis of the result of the player state determination process (step S112). The event control process implemented in step S200 is described later.

When the state detection processing section 112 determines that the player is in the specific state, the effect control processing section 114, the image generation section 130, and the sound generation section 140 perform a process that corresponds to the event related to the specific state on the basis of the data stored in the data buffer 176 (step S113). When the state detection processing section 112 determines that the player is not in the specific state, step S111 is performed.

When the game calculation section 110 determines that the game termination condition is satisfied, the image generation section 130 and the sound generation section 140 generate and output an image and a sound for producing a game termination effect (step S114), and the game calculation section 110 terminates the process. A different effect is produced as the game termination effect corresponding to the game termination condition.

4-2 Player State Determination Process

Figure 14:
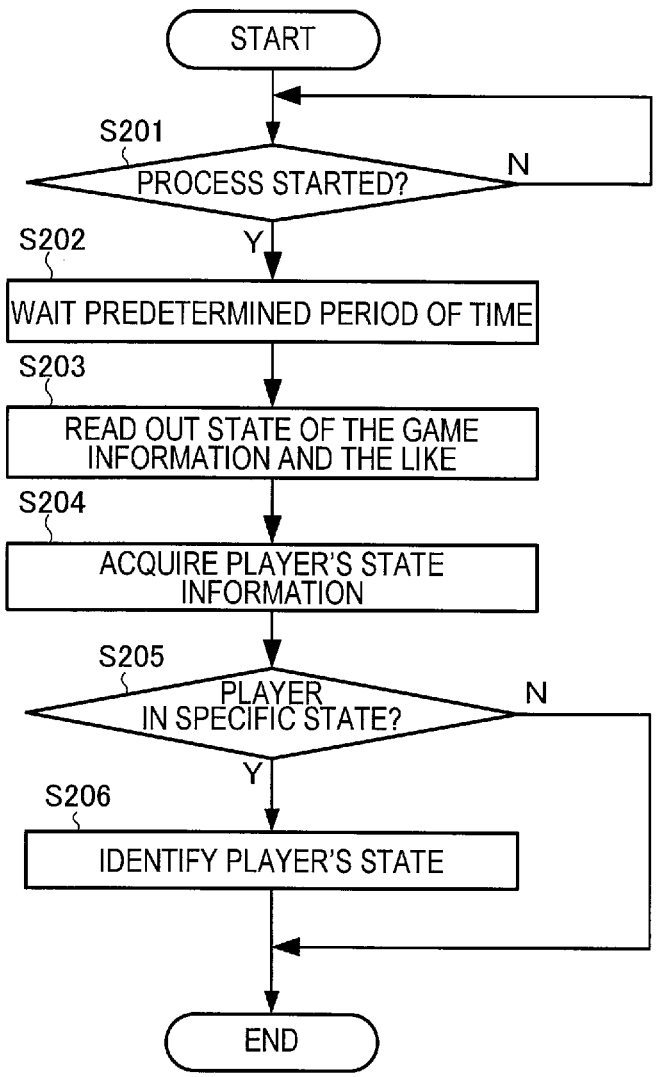
FIG. 14 is a flowchart illustrating the operation of player's state determination process of a game system according to an embodiment of the invention.

The operation of the player state determination process implemented by the game system 1 of the present embodiment is described below with reference to FIG. 14. FIG. 14 is a flowchart illustrating the operation of player state determination process of the game system 1 of the present embodiment.

This operation is comprised of the details of the player state determination process implemented in step S200 of the main process of the game system 1. This operation assumes that the state of the game has been appropriately stored in the data buffer 176, and that the information related to the game environment has been stored, in advance, in the data buffer 176 in step S102 of the main process.

First, when step S200 of the operation of the game system 1 is started (step S201), the state detection processing section 112 waits a predetermined period of time (e.g., 5 ms) (step S202) and then reads out the information related to the game environment (e.g., the level and the attributes of the player P that were acquired in advance) and the information related to the state of the game (hereinafter referred to as "state of the game information") from the data buffer 176 (step S203).

Next, the state detection processing section 112 acquires the information related to the player's state (including the position in the real space of the player P, the attitude based on bone data or the position information related to each part of the player P, and information related to the time of stay at the current position of each part of the player P), and information related to the state of the effect object 80 detected by the state detection processing section 112 (step S204).

Next, while referencing the data stored in the data buffer 176, the state detection processing section 112 determines whether or not the player is in the specific state on the basis of the game environment, the state of the game, the state of the effect object 80, and the acquired player's state (step S205).

When it is determined that the player is in the specific state, the state detection processing section 112 performs step S206, and when it is determined that the player is not in the specific state, the state detection processing section 112 terminates the process.

When it is determined that the player is in the specific state, the state detection processing section 112 determines if the player is in the player fall state, the object drop state, or a predetermined event generation state on the basis of the data that is stored in the data buffer 176 and that was searched in step S205 (step S206) and terminates the process.

5. MODIFICATION EXAMPLES 5-1 Modification Example 1

In the embodiment described above, a case is described in which the simulation process in the simulation space was implemented as a game, but the invention may be implemented as a simulator that is unrelated to a game.

5-2 Modification Example 2

In the embodiment described above, a case is described in which the player's state is detected by using the marker unit 60 and the imaging camera 70, but a configuration is possible in which the player's state is detected using a sensor unit (e.g., contact sensor) placed on the moving path R or the non-moving path NR.

For example, in such a configuration, the state detection processing section 112 determines that the player P is at the position of the sensor unit when he player P is detected by the sensor unit placed on the moving path R.

Alternatively, a configuration is possible in which, when the player P is detected by a sensor unit placed on the non-moving path NR, the state detection processing section 112 detects that the player P has run off the moving path at the position of that sensor unit, and detects the game termination due to the player P failing to move along the moving path.

A configuration is possible in which, in the present embodiment, the position in the real space of the player P and the attitude of the player P are detected corresponding to a player's image captured by the imaging camera 70, without using the marker unit 60. For example, in such a configuration, the state detection processing section 112 calculates the depth direction with respect to each imaging camera 70 on the basis of each image output from each imaging camera 70, and generates bone data of the player P.

The state detection processing section 112 detects the position in the real space of each player using the detected position of the player P in the depth direction with respect to the imaging camera 70, and detects the attitude of the player P using the generated bone data.

5-3 Modification Example 3

Figure 15B:
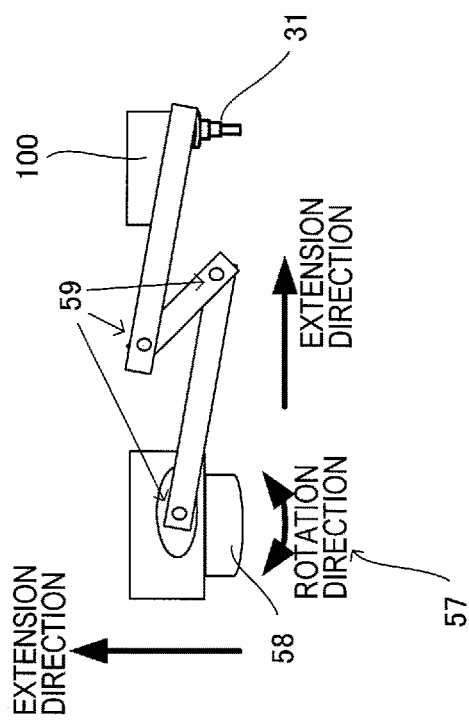
FIG. 15B is a drawing illustrating a modification example of a hanging control unit according to an embodiment of the invention, wherein the hanging control unit is formed from an arm capable of three-dimensionally hanging a hanging unit.
Figure 15A:
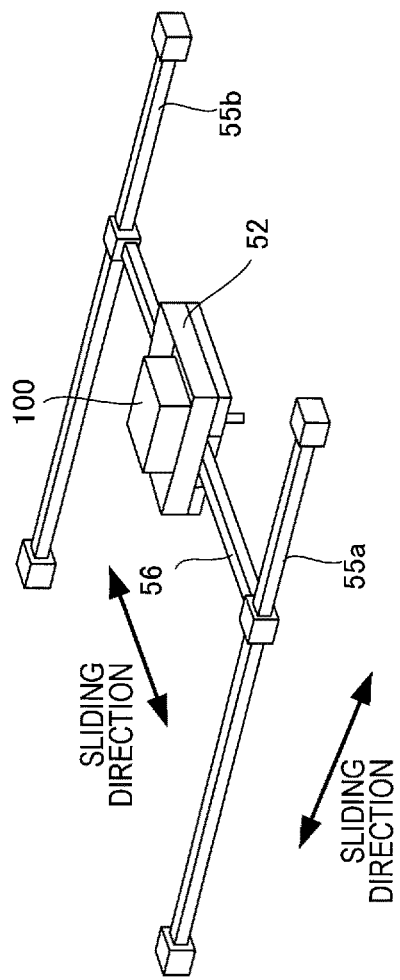
FIG. 15A is a drawing illustrating a modification example of a hanging control unit according to an embodiment of the invention, wherein rails along two axes and a sliding member are formed.

In the embodiment described above, a case is described in which the hanging control unit 50 is formed from the one rail 51 and the sliding member 52 that slides along the rail 51, but a configuration is possible in which the hanging control unit 50 is formed from rails along two or three axes and the sliding member 52 (see FIG. 15A). Additionally, a configuration is possible in which, instead of a rail, the hanging control unit 50 is formed from an arm capable of three-dimensionally hanging the hanging control unit 50 (see FIG. 15B).

Note that FIG. 15A and FIG. 15B are drawings illustrating modification examples of the hanging control unit 50 of the present embodiment. More specifically, FIG. 15A illustrates an example of the hanging control unit 50 wherein rails along two axes and a sliding member are formed, and FIG. 15B illustrates an example of a hanging control unit 50 formed from an arm capable of three-dimensionally hanging the hanging unit 30.

For example, as illustrated in FIG. 15A, the hanging control unit 50 may include a pair of first rails 55a, 55b that move in a two-dimensional manner (i.e., parallel to the ceiling surface) in the real space, and a second rail 56 that is arranged orthogonally to the first rails 55a, 55b and that moves in a two-dimensional manner in the real space.

Specifically, when the player P can move two-dimensionally or three-dimensionally on the moving path R in the real space, the hanging control unit 50 may include a combination of two rails that change the hanging position of the hanging unit 30 along two predetermined axes, or may include a combination of these two rails and another rail for changing the position of the hanging unit 30 in the vertical direction in the real space.

More specifically, when the player P is to move in a two-dimensional manner in the real space, the hanging control unit 50 is formed from two rails that are respectively formed along two predetermined axial directions (the axes are preferably orthogonal to each other) or an arm capable of movement in two directions. When the player P is to move in the vertical direction (e.g., ascending or descending stairs or the like by moving in the direction toward the ceiling or the direction toward the floor of the structure 10), the hanging control unit 50 is formed from the two-dimensional movement components and also a rail formed along a predetermined vertical direction or an arm that can move in the predetermined vertical direction.

As illustrated in FIG. 15B, a configuration is possible in which, instead of the rails, the hanging control unit is formed from an arm 57 that is capable of two-dimensional or three-dimensional movement. Note that, when the hanging control unit is configured to be capable of two-dimensional movement, a rotation stand 58 is provided on the base of the arm 57. When the hanging control unit is configured to be capable of movement along the moving direction of the player P or three-directional movement, the hanging control unit may further include a rotation mechanism 59 that rotates the arm 57 in the vertical direction.

5-4 Modification Example 4

In the present embodiment, a case is described in which the hanging unit 30 slidably moves within the real space by means of the hanging control unit 50 corresponding to the player's state. However, when, the player P does not need to move in the real space (e.g., the player plays the game while seated) or there is no need to link the simulation space to movement in the real space, a configuration is possible in which the hanging unit 30 is directly connected to the ceiling 15 (see FIG. 16).

Figure 16:
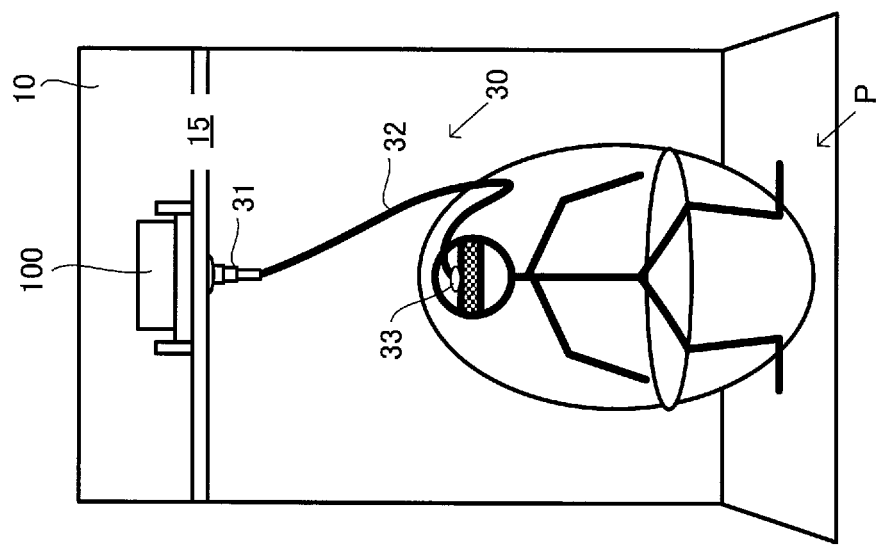
FIG. 16 is a drawing illustrating a modification example of a hanging unit according to an embodiment of the invention.

For example, as illustrated in FIG. 16, the hanging unit 30 includes a link member 31 formed on the ceiling 15 of the structure 10, a string-like member (cable) 32 that has a first end that is shaped to be attached to the link member 31, and a connection member 33 that is used to connect a second end of the string-like member 32 that differs from the first end to the HMD 20.

Specifically, in this modification example, as illustrated in FIG. 16, the string-like member 32 is directly connected to the ceiling 15 of the structure 10. Note that, FIG. 16 is a drawing illustrating a modification example of the hanging unit 30 of the present embodiment, for a case in which the player P does not move.

5-5 Modification Example 5

In the embodiment described above, a case is described in which the plurality of marker units 60 is captured by the imaging camera 70 to detect the position of each part and the attitude of the player P. However, a configuration is possible in which, for example, the position and the posture of the player P are detected by a single marker unit 60 provided to the head or the body of the player P, or the position and the posture of the effect object 80 are detected by a plurality of the marker units 60 provided to the effect object 80.

Additionally, a configuration is possible in which the HMD 20 includes a photosensor, identifiable markers among the plurality of markers provided to the structure are identified by the photosensor, and the position and the posture of the player P are detected on the basis of the identified markers.

5-6 Modification Example 6

In the embodiment described above, a fear of heights experience game was described but, for example, the game system 1 can reproduce not only a high location, but also a dangerous location or environment or situation that is difficult to actually experience such as an enclosed location, a special space, a hot location, and a cold location, corresponding to the state of the player as a specific state or an environment that produces the specific state.

5-7 Modification Example 7

In the embodiment described above, the marker units 60 attached to the player P or to the effect object are imaged by the plurality of imaging cameras 70, and the captured images are analyzed to detect the position and/or the posture of the player P or the like. However, a configuration is possible in which the position and/or posture of the player P is detected using a depth sensor.

More specifically, a configuration is possible in which a plurality of light emitting units, a depth sensor that detects the distance in the depth direction (depth value) of a specific object (specifically, the player P and the effect object 80) on the basis of light emitted from the light emitting units, and an object detection sensor that detects the specific object are provided for each of the plurality of imaging cameras 70. In this configuration, the state detection processing section 112 detects the player's state or the state of the effect object 80 on the basis of information obtained by the depth sensors and the object detection sensors.

The depth sensor acquires a reflected light image (based on light emitted from the light emitting units) of the player or a part of the player P extracted by the object detection sensor, and detects the distance in the depth direction (depth value) of the player P or the part of the player P on the basis of the acquired reflected light image.

The state detection processing section 112 detects the position of the player P in the real space or the position of the part of the player P in the real space on the basis of the detected distance in the depth direction of the player P or the part of the player P, and the position of the player P within the image or the position of the part of the player P within the image obtained by the object detection sensor.

5-8 Modification Example 8

In the embodiment described above, the marker units 60 attached to the player P and the like are imaged by the plurality of imaging cameras 70 and the captured images are analyzed to detect the position and/or the posture of the player P or the like. However, a configuration is possible in which, instead of the marker units 60, the position and/or posture of the player P is detected using an ultrasonic transmitter attached to the player P or each part of the player P.

More specifically, in such a configuration, a plurality of receiving microphones that receive ultrasonic waves is arranged at predetermined positions of the structure 10 (e.g., four microphones, one at each of the four corners of the structure) and the distance in the receiving direction of the ultrasonic waves emitted from the ultrasonic transmitter is detected and measured to detect the position of the player P or the position of the part of the player P in the real space.

Note that, the position of each player P or the position of the part of each player P in the real space can be detected by changing the frequency of the ultrasonic waves on an ultrasonic transmitter basis.

5-9 Modification Example 9

In the embodiment described above, the marker units 60 attached to the player P and the like are imaged by the plurality of imaging cameras 70 and the captured images are analyzed to detect the position and/or the posture of the player P or the like.

However, a configuration is possible in which the position of the player P or the position of the part of the player P in the real space is detected using a pattern image of the player P, a pattern image of the effect object 80, or a pattern image of the part of the player P to detect the corresponding region in the image and the size of the region from the captured images.

6. OTHER

The invention is not limited to the embodiments described above. Various modifications and variations may be made of the embodiments described above. Any term cited with a different term having a broader meaning or the same meaning at least once in the specification and the drawings may be replaced by the different term in any place in the specification and the drawings.

The invention includes various other configurations substantially the same as the configurations described above in connection with the embodiments (e.g., a configuration having the same function, method, and results, or a configuration having the same objective and effects). The invention also includes a configuration in which an unsubstantial element described above in connection with the embodiments is replaced by another element. The invention also includes a configuration having the same effects as those of the configurations described above in connection with the embodiments, or a configuration capable of achieving the same objective as that of the configurations described above in connection with the embodiments. The invention further includes a configuration in which a known technique is added to the configurations described above in connection with the embodiments.

Although only some embodiments of the invention have been described in detail above, those skilled in the art would readily appreciate that many modifications are possible in the embodiments without materially departing from the novel teachings and advantages of the invention. Accordingly, all such modifications are intended to be included within the scope of the invention.

REFERENCE SIGNS LIST

1 Game system
10 Structure
20 HMD
30 Hanging unit
40 Fall prevention unit
50 Hanging control unit
60 Marker unit
70 Imaging camera
80 Effect object
90 Effect device (blower, automatic door, spring panel, and moving path member)
100 Simulation control device

What is claimed is:

1. An experience-type simulation system in which a user utilizes a wearable image display device that comprises a structure masking each eye of a user and that visualizes an image of a virtual three-dimensional space, the user moving, of their own accord, on a moving path formed in user movement space in which the user can move; the simulation system comprising:
   a processor programmed to function as:
      a detection device that detects a user's state that represents a state of the user in the user movement space;
      an image generation device that performs an image generation process that generates a simulation image corresponding to the detected user's state, the simulation image being viewed from the user and representing the virtual three-dimensional space that corresponds to the user movement space, the simulation image including a virtual moving path that is linked to the moving path;
      a display control device that displays the generated simulation image on the wearable image display device; and
      a state determination device that determines that the user is in a specific state in the virtual three-dimensional space when the user's state has satisfied a given condition in the user movement space in which the user moves or interacts within a real environment; wherein
      the image generation device generates a simulation image that produces an effect based on the specific state when it is determined that the user is in the specific state.

2. The simulation system as defined in claim 1, further comprising:
   an effect unit that is provided in the user movement space and that performs an effect process to allow the user to experience the virtual three-dimensional space corresponding to at least one of the user's state and a run state of the simulation.

3. The simulation system as defined in claim 2, wherein the effect unit is visualized as an effect object in the virtual three-dimensional space, and
the image generation device visualizes a state of the effect object in the virtual three-dimensional space that differs from the state of the effect object in the user movement space corresponding to at least one of the user's state and the run state of the simulation.

4. The simulation system as defined in claim 3, further comprising:
a positional relationship determination device that determines whether the effect unit, provided in the user movement space and visualized as the effect object, and the user are in a given positional relationship in the user movement space; wherein
the image generation device generates the simulation image in which the effect unit is visualized as the effect object corresponding to a determination result of the positional relationship determination device.

5. The simulation system as defined in claim 2, wherein the effect unit includes a moving path member formed at a height that differs from a floor of a structure forming the simulation system.

6. The simulation system as defined in claim 2, wherein the effect unit includes
a moving path member that includes an effect area that is provided under a predetermined moving path on which the user moves, and that is formed capable of vibrating or swinging, and
a driving device that vibrates or swings the effect area on the basis of a given condition.

7. The simulation system as defined in claim 1, wherein the detection device
detects, as part information, information about a physical part or appendage of the user wearing the wearable image display device in the user movement space, and
detects the user's state on the basis of the detected part information.

8. The simulation system as defined in claim 7, wherein the detection device
detects the part information about a plurality of physical parts or appendages of the user in the user movement space, and
detects, as the user's state, an attitude of the user in the user movement space on the basis of the detected part information about the plurality of physical parts or appendages.

9. The simulation system as defined in claim 7, wherein the detection device
detects the user's state on the moving path in the user movement space on the basis of the detected part information of the user in the user movement space, and
detects the user's state with respect to a virtual moving path corresponding to the moving path in the user movement space on the basis of the detected user's state on the moving path in the user movement space.

10. The simulation system as defined in claim 7, wherein the detection device
detects, as the part information, one or more pieces of information about a direction and a position of a given part of the user in the user movement space and a length of time of the part at the position, and
detects, as the user's state, one of a position of the user and an attitude of the user in the user movement space on the basis of the part information.

11. The simulation system as defined in claim 10, wherein the part of the user includes a foot of the user; and
the detection device
detects a relationship in the virtual three-dimensional space between the foot of the user and the virtual moving path that corresponds to the moving path on the basis of the detected part information of the foot, and
detects the user's state with respect to the virtual moving path on the basis of the detected relationship.

12. The simulation system as defined in claim 11, wherein the detection device
detects a correlation between the foot of the user and the virtual moving path as the relationship in the virtual three-dimensional space between the foot of the user and the virtual moving path corresponding to the moving path, the correlation being at least one of an amount of time the foot of the user is separated from the virtual moving path, and a distance in the virtual space between the foot of the user and the virtual moving path.

13. The simulation system as defined in claim 12, wherein the relationship between the foot of the user in the virtual three-dimensional space and the virtual moving path corresponding to the moving path includes a height element in the virtual three-dimensional space, the height element being the distance in the virtual space between the foot of the user and the virtual moving path, and
the detection device increases a weighting of the height element more than a weighting of another element when detecting the correlation between the foot of the user and the virtual moving path.

14. The simulation system as defined in claim 1, further comprising:
a structure in which a user movement space in which a user can move is formed;
a hanging unit that hangs the wearable image display device structure from the structure; and
a hanging position changing device that changes a hanging position of the wearable image display device on the hanging unit corresponding to movement of the user in the user movement space.

15. An experience-type game system in which a user utilizes a wearable image display device that comprises a structure masking each eye of a user and that visualizes an image of a virtual three-dimensional space, the user moving, of their own accord, on a moving path formed in user movement space in which the user can move; the game system comprising:
a processor programmed to function as:
a detection device that detects a user's state that represents a state of the user in the user movement space;
an image generation device that performs an image generation process to generate a simulation image that corresponds to the detected user's state, the simulation image being viewed from the user and representing virtual three-dimensional space that corresponds to the user movement space, the simulation image including a virtual moving path that is linked to the moving path;

a display control device that displays the generated simulation image on the wearable image display device; and a state determination device that determines that the user is in a specific state in the virtual three-dimensional space when the user's state has satisfied a given condition in the user movement space in which the user moves or interacts within a real environment; wherein the image generation device generates a simulation image that produces an effect based on the specific state when it is determined that the user is in the specific state.

* * * * *